US011137856B2

(12) United States Patent
Shepelev et al.

(10) Patent No.: US 11,137,856 B2
(45) Date of Patent: Oct. 5, 2021

(54) SENSOR ELECTRODE PATTERNS FOR INPUT DEVICES

(71) Applicant: SYNAPTICS INCORPORATED, San Jose, CA (US)

(72) Inventors: Petr Shepelev, Campbell, CA (US); Tetsuo Tanemura, Tokyo (JP); HaThanh Nguyen, Tokyo (JP); Takayuki Noto, Tokyo (JP); Hiroshi Takeyama, Tokyo (JP); Takeshi Hashimoto, Tokyo (JP); Tsuyoshi Kuroiwa, Tokyo (JP); Arnulf Graf, Pasadena, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/638,017

(22) PCT Filed: Aug. 1, 2018

(86) PCT No.: PCT/US2018/044869
§ 371 (c)(1),
(2) Date: Feb. 10, 2020

(87) PCT Pub. No.: WO2019/032351
PCT Pub. Date: Feb. 14, 2019

(65) Prior Publication Data
US 2020/0167040 A1 May 28, 2020

Related U.S. Application Data

(60) Provisional application No. 62/630,223, filed on Feb. 13, 2018, provisional application No. 62/543,623, filed on Aug. 10, 2017.

(51) Int. Cl.
G06F 3/041 (2006.01)
G06F 3/044 (2006.01)
G06F 3/047 (2006.01)

(52) U.S. Cl.
CPC .......... *G06F 3/04164* (2019.05); *G06F 3/047* (2013.01); *G06F 3/0412* (2013.01);
(Continued)

(58) Field of Classification Search
CPC .......... G06F 3/04164; G06F 3/041662; G06F 3/0446; G06F 3/0412; G06F 3/047; G06F 2203/04103; G06F 2203/04111
See application file for complete search history.

(56) References Cited

U.S. PATENT DOCUMENTS 9,619,083 B1 * 4/2017 Kang ..................... G09G 5/006
10,747,377 B2 * 8/2020 Teranishi ................ G06F 3/047
(Continued)

OTHER PUBLICATIONS

International Application No. PCT/US2018/044869—International Search Report and Written Opinion dated Nov. 14, 2018 consists of 9 pages.
(Continued)

Primary Examiner — Lisa S Landis
(74) Attorney, Agent, or Firm — Leydig, Voit & Mayer, Ltd.

(57) ABSTRACT

A sensing device comprises sensor electrodes arranged in an array of rows and columns, and vias. A first vias is arranged in a first direction, and corresponds to a first column of sensor electrodes adjacent to a first side edge of the sensing device. A second via is arranged in a second direction different than the first direction, and corresponds to a second column of the sensor electrodes adjacent to a second side edge of the sensing device. Each of the sensor electrodes is configured to be coupled to a routing trace through one of the vias. In a first row of the plurality of sensor electrodes,
(Continued)

a two vias are different distances from the first side edge and in a second row of the plurality of sensor electrodes, two vias are different distances from the second side edge.

21 Claims, 11 Drawing Sheets

(52) U.S. Cl.
CPC ...... *G06F 3/0446* (2019.05); *G06F 3/041662* (2019.05); *G06F 2203/04103* (2013.01); *G06F 2203/04111* (2013.01)

(56) References Cited

U.S. PATENT DOCUMENTS

| | | |
|---|---|---|
| 2013/0147724 A1 | 6/2013 | Hwang et al. |
| 2015/0145821 A1 | 5/2015 | Kim et al. |
| 2015/0309634 A1 | 10/2015 | Lee et al. |
| 2016/0291721 A1 | 10/2016 | Shepelev et al. |
| 2016/0349890 A1 | 12/2016 | Weng et al. |
| 2017/0017341 A1* | 1/2017 | Chen ..................... G06F 3/0443 |

OTHER PUBLICATIONS

International Application No. PCT/US2018/044869—International Preliminary Report on Patentability dated Feb. 20, 2020 consists of 6 pages.

* cited by examiner

SENSOR ELECTRODE PATTERNS FOR INPUT DEVICES

CROSS-REFERENCE TO RELATED APPLICATIONS

This application claims benefit of PCT Application No. PCT/US2018/044869, filed Aug. 1, 2018 which claims priority from U.S. Provisional Application No. 62/630,223 filed Feb. 13, 2018, and claims priority from from U.S. Provisional Application No. 62/543,623 filed Aug. 10, 2017, which are incorporated by reference in their entirety

BACKGROUND

Field

Embodiments disclosed herein generally relate to electronic devices, and more specifically, to input devices having sensor electrode patterns.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones.

SUMMARY

In one embodiments, a sensing device comprises a plurality of sensor electrodes arranged within an array of rows and columns, the array defining an area having a top edge, a first side edge connected with the top edge, and a second side edge connected with the top edge, a first plurality of vias, a second, plurality of vies, and a plurality of routing traces. The first plurality of vies is arranged in a first direction, and corresponds to a first column of the plurality of sensor electrodes adjacent to the first side edge. The second plurality of vies is arranged in a second direction different than the first direction, and corresponds to a second column of the plurality of sensor electrodes adjacent to the second side edge. Each of the plurality of sensor electrodes is configured to be coupled to a respective one of the plurality of routing traces through a respective one of the first plurality of vias and the second plurality of vias. In a first row of the plurality of sensor electrodes, a first via of the first plurality of vias is a first distance from the first side edge, and a first via of the second plurality of vies is a second distance from the second side edge. In a second row of the plurality of sensor electrodes, a second via of the first plurality of vias is a third distance from the first side edge, and a second via of the second plurality of vias is a fourth distance from the second side edge. The first distance is greater than the third distance, and the second distance is greater than the fourth distance.

In another embodiment, a processing system comprises sensor module configured to be coupled with a plurality of sensor electrodes arranged within an array of rows and columns, the array defining an area having a top edge, a first side edge connected with the top edge, and a second side edge connected with the top edge. Each of the plurality of sensor electrodes disposed in a first column of the columns adjacent to the first side edge is coupled to a respective routing trace through a respective one of a first plurality of vias arranged in a first direction. Each of the plurality of sensor electrodes disposed in a second column of the columns adjacent to the second side edge is coupled to a respective routing trace through a respective one of a second plurality of vias arranged in a second direction different than the first direction. In a first row of the rows, a first via of the first plurality of vias is a first distance from the first side edge, and a first via of the second plurality of vias is a second distance from the second side edge. In a second row of the rows, a second via of the first plurality of vias is a third distance from the first side edge, and a second via of the second plurality of vias is a fourth distance from the second side edge. The first distance is greater than the third distance, and the second distance is greater than the fourth distance. The sensor module is further configured to acquire resulting signals by driving the plurality of sensor electrodes with sensing signals.

In another embodiment, a method for operating a sensing device comprises driving one or more of a plurality of sensor electrodes to acquire resulting signals from a plurality of sensor electrodes, and determining positional information for input object based at least in part on the resulting signals. The plurality of sensor electrodes are arranged within an array of rows and columns, the array defining an area having a top edge, a first side edge connected with the top edge, and a second side edge connected with the top edge. Each of the plurality of sensor electrodes disposed in a first column of the columns adjacent to the first side edge is coupled to a respective routing trace through a respective one of a first plurality of vias arranged in a first direction. Each of the plurality of sensor electrodes disposed in a second column of the columns adjacent to the second side edge is coupled to a respective routing trace through a respective one of a second plurality of vias arranged in a second direction different than the first direction. In a first row of the rows, a first via of the first plurality of vias is a first distance from the first side edge, and a first via of the second plurality of vias is a second distance from the second side edge. In a second row of the rows, a second via of the first plurality of vias is a third distance from the first side edge, and a second via of the second plurality of vias is a fourth distance from the second side edge. The first distance is greater than the third distance, and the second distance is greater than the fourth distance.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
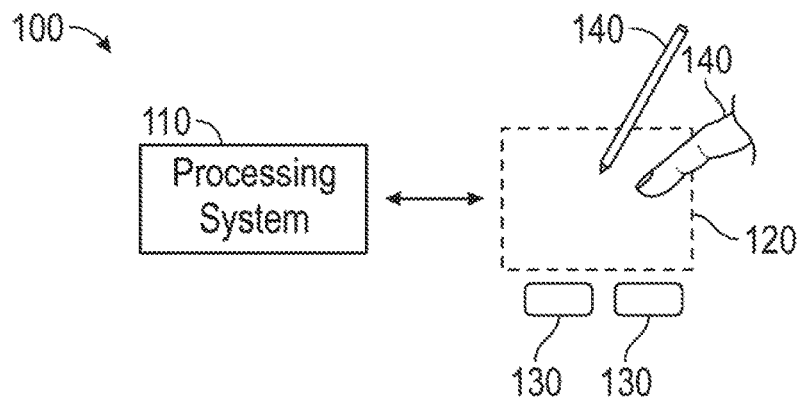
FIG. 1 is a schematic block diagram of an input device according to one more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description merely exemplary in nature and is not intended to limit the disclosure or the application and uses of the disclosure. Furthermore, there is no intention to be bound by any expressed or implied theory presented in the preceding background, summa the following detailed description.

Exemplary Input Device Implementations

Turning now to the figures. FIG. 1 is a block diagram of an exemplary input device 100, in accordance with embodiments of the disclosure. The input device 100 may be configured to provide input to an electronic system (not shown). As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data, input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, the electronic system could be a host or a slave to the input device. The electronic system may also be referred to as electronic device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI PS/2, Universal Serial Bus (USB), Bluetooth, RF, and IRDA.

In FIG. 1, the input device 100 is shown as a proximity sensor device configured to sense input provided by one or more input objects 140 in a sensing region 120. Example input objects 140 include fingers and styli, as shown in FIG. 1. An exemplary proximity sensor device may b a touchpad, a touch screen, a touch sensor device and the like.

Sensing region 120 encompasses any space above, around, in and/or near the input device 100 in which the input device 100 is able to detect user input, e.g., user input provided by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiment's sense input that comprises: no contact with any surfaces of the input device 100; contact with an input surface, e.g. a touch surface, of the input device 100: contact with an input surface of the input device 100 coupled with some amount of applied force or pressure; and/or a combination thereof. In various embodiments, input surfaces may be provided by surfaces of casings within which the sensor electrodes (also referred to herein as sensing electrodes) reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g. system ground, and by detecting the capacitive coupling between the sensor electrodes and input objects.

Some capacitive implementations utilize "mutual capacitance" (also often erred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling, between one or more transmitter sensor electrodes (also referred to herein as "transmitter electrodes" or "transmitters") and one or more receiver sensor electrodes (also referred to herein as "receiver electrodes" or "receivers"). Transmitter sensor electrodes may be modulated relative to a reference voltage, e.g., system ground, to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference, e.g. other electromagnetic signals. Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system, e.g., to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with addition input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of a display screen. For example, the sensing region 120 may overlap at least a portion of an active area of a display screen. The active area of the display screen may correspond to a portion of the display screen where images are updated. In one or more embodiments, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray, tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110. The display screen may also be referred to as a display panel.

It should be understood that while many embodiments of the disclosure are described in the context of a fully functioning apparatus, the mechanisms of the present disclosure are capable of being distributed as a program product, software, in a variety of forms. For example, the mechanisms of the present disclosure may be implemented and distributed as a software program on information bearing media that are readable by electronic processors, e.g., non-transitory computer-readable and/or recordable/writable information bearing media readable by the processing system 110. Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Exemplary Sensor Device Implementations

Figure 2:
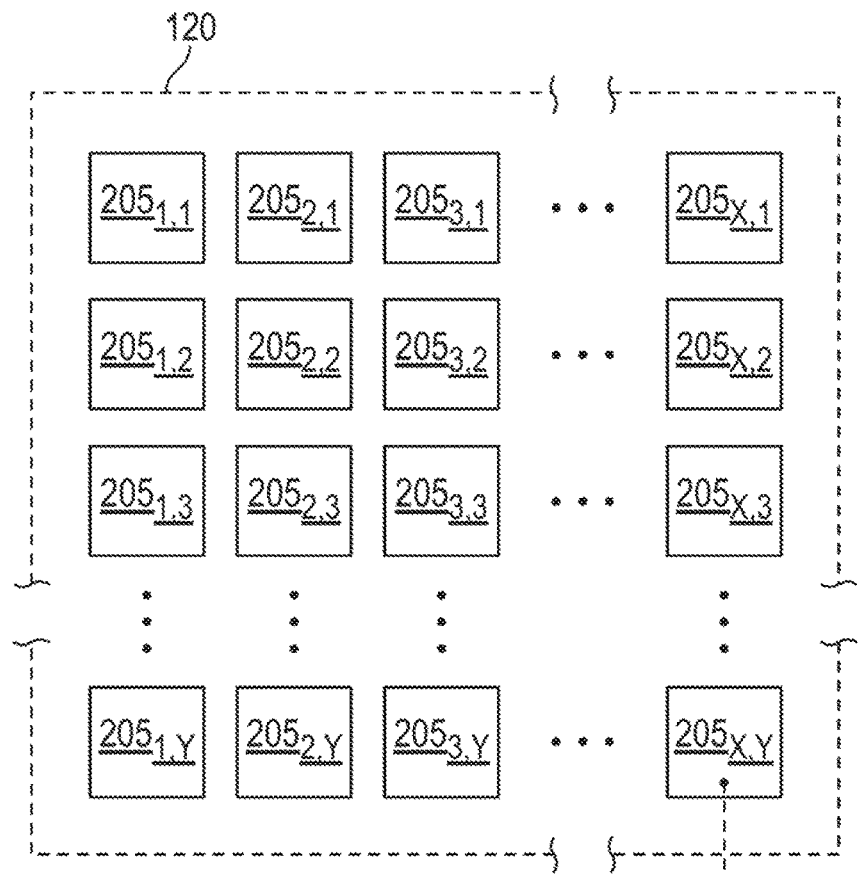
FIG. 2 illustrate electrode arrangement, according to one or more embodiments.
Figure 2:
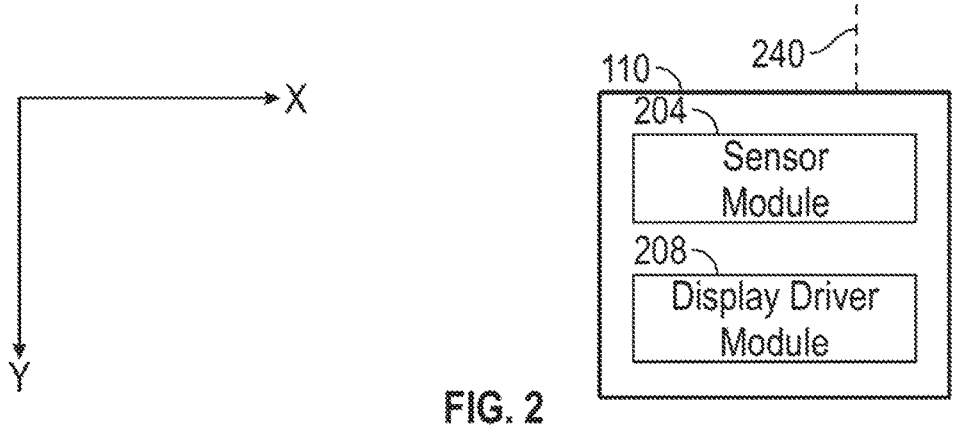

FIG. 2 shows a portion of an exemplary patter of capacitive sensing pixels 205 (also referred to herein as capacitive pixels or sensing pixels) configured to sense in the sensing region 120 associated with a pattern, according to some embodiments. Each capacitive pixel 205 may include one of more of the sensing elements described above. For clarity of illustration and description, FIG. 2 presents the regions of the capacitive pixels 205 in a pattern of simple rectangles and does not show various other components within the capacitive pixels 205. In one embodiment, the capacitive sensing pixels 205 are areas of localized capacitance of corresponding sensor electrodes. Capacitive pixels 205 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive pixels 205, and thus may be used as an indicator of the presence of the input object in the sensing region 120 of the input device.

The exemplary pattern comprises an array of capacitive sensing pixels $205_{X,Y}$ (referred collectively as pixels 205) arranged in X columns and Y rows in a common plane, wherein X and Y are positive integers, although one of X and Y may be zero. It is contemplated that the pattern of sensing pixels 205 may comprises a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes in the sensing pixels 205 may be any shape such as circular, rectangular, diamond, star, square, noncovex, convex, non-concave concave, etc. As shown here, the sensing pixels 205 are coupled to the processing system 110 and utilized to determine the presence of (or lack thereof) an input object in the sensing region 120.

In a first mode of operation, at, least one sensor electrode within the capacitive sensing pixels 205 may be utilized to detect the presence of an input object via absolute sensing techniques. A sensor module 204 in processing system 110 is configured to drive a sensor electrode using a trace 240 in each pixel 205 with a an absolute capacitive sensing signal and measure a capacitance between the sensor electrode and the input object based on the absolute capacitive sensing signal, which is utilized by the processing system 110 or other processor to determine the position of the input object. The absolute capacitive sensing signal may be a modulated signal comprising a varying voltage.

The various electrodes of capacitive pixels 205 are typically ohmically isolated from the electrodes of other capacitive pixels 205. Additionally, where a pixel 205 includes multiple electrodes, the electrodes may be ohmically isolated from each other. That is, one or more insulators separate the sensor electrodes and prevent them from electrically shorting to each other.

In a second mode of operation, sensor electrodes in the capacitive pixels 205 are utilized to detect the presence of an input object via transcapacitance sensing techniques. That is, processing system 110 may drive at least one sensor electrode in a pixel 205 with a transmitter signal and receive resulting signals using one or more of the other sensor electrodes in the pixel 205, where a resulting signal comprising effects corresponding to the transmitter signal. The resulting signal is utilized by the processing system 110 or other processor to determine the position of the input object. The sensor electrodes that are driven with the transmitter signal are modulated by the transmitter signal relative to the sensor electrodes that receive the resulting signals. In one embodiment, both the sensor electrodes that are driven with the transmitter signal and the sensor electrodes that receive the resulting signals are modulated.

The input device 100 may be configured to operate in any one of the modes described above. The input device 100 may also be configured to switch between the two modes described above.

In some embodiments, the capacitive pixels 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 205.

In other embodiments, "scanning" pixels 205 to determine these capacitive coupling includes driving with an absolute capacitive sensing signal and measuring the absolute capacitance of one or more of the sensor electrodes. In another embodiment, the sensor electrodes may be operated such that the absolute capacitive sensing signal is driven on a sensor electrode in multiple capacitive pixels 205 at the same time. In such embodiments, an absolute capacitive measurement may be obtained from each of the one or more pixels 205 simultaneously. In one embodiment, the input device 100 simultaneously drives a sensor electrode in a plurality of capacitive pixels 205 and measures an absolute capacitive measurement for each of the pixels 205 in the same sensing cycle. In various embodiments, processing system 110 may be configured to selectively drive and receive with a portion of sensor electrodes. For example, the sensor electrodes may be selected based on, but not limited to, an application running on the host processor, a status of the input device, an operating mode of the sensing device and a determined location of an input device. The host processor may be central processing unit or any other processor of an electronic device.

A set of measurements from the capacitive pixels 205 form a capacitive image or capacitive frame representative of the capacitive couplings at the pixels 205 as discussed above. Multiple capacitive images may be acquired over multiple time periods, and differences between them used to derive information about input in the sensing region. For example, successive capacitive images acquired over successive periods of time can be used to track the motions) of one or more input objects entering, exiting, and within the sensing region.

In some embodiments, one or more of the sensor electrodes in the capacitive pixels 205 include one or more display electrodes used, in updating, the display of the display screen. In one or more embodiment, the display electrodes comprise one or more segments of a common voltage electrode, also referred to as a Vcom electrode, a source drive line, gate line, an anode electrode or cathode electrode, or any other display element. These display electrodes may be disposed on an appropriate display screen substrate. For example, in display screens such as In Plane Switching (IPS) and Plane to Line Switching (PLS) Organic Light Emitting Diode (OLED), the display electrodes may be disposed on a transparent substrate, e.g., a glass substrate, TFT glass, or any other transparent material). In other embodiments, in display screens such as Patterned Vertical Alignment (PVA) and Multi-domain Vertical Alignment (MVA), the display electrodes may be disposed on the bottom of a color filter glass. In one or more embodiments, the display electrodes may be disposed over an emissive layer of an OLED display. In such embodiments, an electrode that is used as both a sensor electrode and a display electrode can also be referred to as a combination electrode, since it performs multiple functions.

Continuing to refer to FIG. 2, in various embodiments, the processing system 110 coupled to the sensing electrodes includes a sensor module 204 and optionally, a display driver module 208. In one embodiment, the sensor module 204 comprises circuitry configured to drive a transmitter signal or an absolute capacitive sensing signal onto the sensing electrodes and receive resulting signals with the sensing electrodes during periods in which input sensing is desired.

In one or more embodiments, the sensor module 204 comprises a transmitter module including circuitry configured to drive a transmitter signal onto the sensing electrodes during periods in which input sensing is desired. In one or more embodiments, the transmitter signal is modulated and contains one or more bursts over a period of time allocated for input sensing. The transmitter signal may have an amplitude, frequency and voltage which may be changed to obtain more robust location information of the input object in the sensing region 120. The absolute capacitive sensing signal may be the same or different from the transmitter signal used in transcapacitance sensing. The sensor module 204 may be selectively coupled to one or more of the sensor electrodes in the capacitive pixels 205. For example, the sensor module 204 may be coupled to selected portions of the sensor electrodes and operate in either an absolute or transcapacitance sensing mode. In another example, the sensor module 204 may be coupled to different sensor electrodes when operating in the absolute sensing mode than when operating in the transcapacitance sensing mode.

In various embodiments, the sensor module 204 comprises sensor circuitry and the sensor module is configured to receive a resulting signal with the sensing electrodes comprising effects corresponding to the transmitter signal during periods in which input sensing is desired. In one or more embodiments, the sensor module 204 is configured to receive a resulting signal from a sensor electrode that is driven with an absolute capacitive sensing signal to determine changes in absolute capacitance between the sensor electrode and an input object. In one or more embodiments, the sensor module 204 determines a position of the input object in the sensing region 120. In one or more embodiments, the sensor module 204 provides a signal including information indicative of the resulting signal to another module or processor such as a determination module of the processing system 110 or a processor of the electronic device, e.g., a host processor, for determining the position of the input object in the sensing region 120. In one or more embodiments, the sensor module comprises a plurality of receivers, where each receiver may be an analog front ends (AFEs).

In one or more embodiments, capacitive sensing or input sensing and display updating may occur during at least partially overlapping periods. For example, as a combination electrode is driven for display updating, the combination electrode may also be driven for capacitive sensing. Overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times.

The display driver module 208 includes circuitry configured to provide display image update information to the display of the display device during non-sensing periods, e.g., display updating periods. The display driver module 208 may be included with or separate from the sensor module 204. In one embodiment, the processing system comprises a first integrated controller comprising the display driver module 208 and at least a portion of the sensor module 204. The sensor module 204 may comprise a transmitter circuitry and/or a receiver circuitry. In another embodiment, the processing system comprises a first integrated controller comprising the display driver module 208 and a second integrated controller comprising the sensor module 204. In yet another embodiment, the processing system comprises a first integrated controller comprising a display driver module 208 and one of a transmitter circuitry and a receiver circuitry and a second integrated controller comprising the other one of the transmitter circuitry and receiver circuitry.

Exemplary Via and Routing Arrangements

Figure 3A:
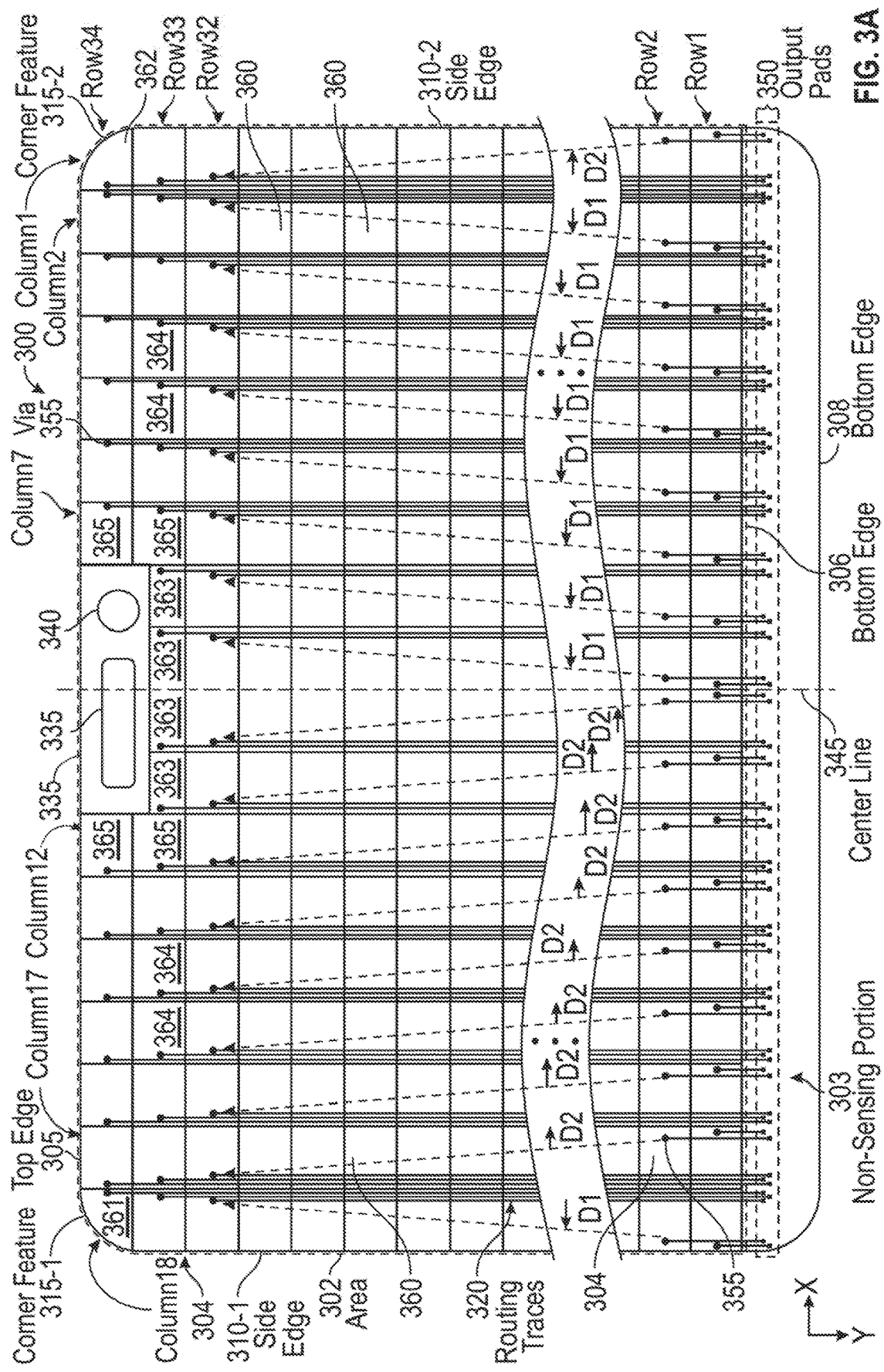
FIGS. 3A and 3B illustrate arrangements of visa and routing traces for an input device, according to one or more embodiments.

FIG. 3A illustrates an exemplary arrangement 300 of vias and routing traces for an input device, according to embodiments described herein. The arrangement 300 may be used in conjunction with other embodiments described herein, such as the input device 100 and processing system 110 depicted in FIGS. 1 and 2. The input device may have an edge-to-edge display. For example, the width of one or more of the bezels of input devices including edge-to-may be reduced, increasing the display screen size relative to the size of the input device. In one or more embodiments, an edge-to-edge display may be characterized by including only a minimal bezel around several dimensions of the display screen, or by omitting the bezel entirely.

As the size of the display screen, e.g., display panel, of input devices increases, to maintain portability of the input devices, it can be beneficial to reduce bezel sizes for a particular form factor, such that the display screen occupies a larger proportion of a surface of the input device. In such input devices, the display area and/or the sensing area substantially extend from one edge to another edge of the input device. In one embodiment, the display area and/or the sensing area substantially extend from a first side edge to a second side edge and from a bottom edge to a top edge of an input device. In various embodiments, increasing the size of display screens or display panels, generally corresponds to an increased sensing region. In one or more embodiments, an input device having reduced bezels and an edge-to-edge display may be referred to as bezel-less or near bezel-less input device. Further, edge-to-edge displays may also increase usability of the input device, as a larger sensing allows for more advanced gesture inputs and a larger display screen allows for more and different types of information to be displayed.

In various embodiments, arrangement 300 includes a plurality of sensor electrodes 304 that are arranged within an array of rows and columns. In one embodiment, arrangement 300 includes 34 rows (indexed as Rows 1, 2, . . . , 34) and 18 columns (indexed as Columns 1, 2, . . . , 18). In other embodiments, other numbers of rows and/or columns are also possible. In one embodiment, each entry of the array includes a sensor electrode 304. In other embodiments, one or more entries of the array may not include a sensor electrode 304. In various embodiments, while most of the sensor electrodes 304 may have a substantially same top surface area and a rectangular shape, other shapes and/or sizes are also possible within the array. The top surface area corresponds to a surface of the sensor electrode that is configured to be closer to an input surface of the input device than the other surfaces of the sensor electrodes. In one or more embodiments, the top surface area of each of the sensor electrodes may be considered to be similar, if they are at least within manufacturing tolerances of each other. Further, the top surface area of each of the sensor electrodes may be considered to be similar if they are at least within a threshold percentage of each other. For example, the top surface area of each of the sensor electrodes may be considered to be similar if they differ by no more than 15% from each other.

In various embodiments, the array defines an area 302 having a top edge 305, a bottom edge 306, a first side edge 310-1, and a second side edge 310-2. The area 302 may be a substantially contiguous area. In one embodiment, the top edge 305 is substantially orthogonal to the first side edge 310-1 and to the second side edge 310-2. In other embodiments, other relative orientations of the edges are also possible. In some embodiments, the first side edge 310-1 corresponds to a left side edge of the input device, and the second side edge 310-2 corresponds to a right side edge of the input device.

In some embodiments, a first corner feature 315-1 connects the top edge 305 with the first side edge 310-1, and a second corner feature 315-2 connects the top edge 305 with the second side edge 310-2. In some embodiments, the first corner feature 315-1 and the second corner feature 315-2 substantially follow the mechanical design, e.g., curved features, of the input device. In some embodiments, the area 302 is substantially a rounded rectangle, and each of the first corner feature 315-1 and the second corner feature 315-2 are curved. In other embodiments, the area 302 has a different shape, such that the first corner feature 315-1 and the second corner feature 315-2 are also different. For example, for an input device having a substantially octagonal shape, the first corner feature 315-1 and the second corner feature 315-2 may each be a straight line extending between the top edge 305 and the respective first side edge 310-1 and the second side edge 310-2. In another example, the first corner feature 315-1 and the second corner feature 315-2 are an intersection of the top edge 305 and the respective first side edge 310-1 and the second side edge 310-2.

In some embodiments, one or more sensor electrodes 361, 362 that border the first corner feature 315-1 and the second corner feature 315-2, respectively, have a smaller top surface area and/or a different shape than one or more non-bordering sensor electrodes 360. The sensor electrodes 361, 362 may be referred to as bordering sensor electrodes. The bordering sensor electrodes may include any sensor electrode that is affected by a corner feature, e.g., 315-1 and/or 315-2. The non-bordering sensor electrode 360 may include any sensor electrode that is at least one row and/or column removed from a bordering sensor electrode. The sensor electrodes 361, 362 may be described as "truncated" sensor electrodes having a top surface area less than the top surface area of top surface area the non-bordering sensor electrodes 360. For example, the sensor electrodes 361, 362 may have a top surface area that is less than that of sensor electrodes disposed closer a center of area 302 than either of top edge 305, side edge 310-1 and side edge 310-1.

In some embodiments, the non-bordering sensor electrodes 360 each have a rectangular shape and a similar top surface area with each other, while the bordering sensor electrodes 361, 362 each have a circular edge shape matching the edge shape of the corner features and a smaller top surface area than that of the non-bordering sensor electrodes 360. In other embodiments, the non-bordering sensor electrodes 360 may have a rectangular shape but one or more of the non-bordering sensor electrodes 360 has a different top surface area than that of another one of the non-bordering sensor electrodes 360.

In various embodiments, one or more of the bordering sensor electrodes 361, 362 may have a top surface area that is similar to one or more of the other non-bordering sensor electrodes 360 and a shape that differs from one or more of the other non-bordering sensor electrodes 360

In some embodiments, the first corner feature 315-1 and the second corner feature 315-2 each span a single sensor electrode, e.g., bordering sensor electrodes 361 and 362, respectively. In other embodiments, a length and/or radius of curvature of the first corner feature 315-1 and the second corner feature 315-2 may be larger, such that the first corner feature 315-1 and the second corner feature 315-2 may extend: across two or more sensor electrodes 304.

The arrangement 300 may be used in implementations of an input device having an edge-to-edge display. As a result, in some embodiments, the top edge 305, the first side edge 310-1, and/or the second side edge 310-2 may correspond to an extent of the input device. The top edge 305, the first side edge 310-1, and/or the second side edge 310-2 may include some curvature corresponding to the mechanical design of the input device. In some embodiments, the area 302 may be coextensive with an active area of a display device.

The area 302 may define at least one opening 330. The opening 330 may be included to provide additional functionality for the input device. For example, in the case of a smart phone, a speaker device 335 and/or a camera device 340 may be disposed within the opening 330. Other types of input devices and/or output devices may be included within the opening 330. The opening 330 may also be referred to as a notch or a notch region.

In some embodiments, the opening 330 is formed by removing materials from a layer(s) of the sensor electrodes 304.

In some embodiments, the opening 330 is proximate or close to the top edge 305. The opening 330 may extend to the top edge 305. Further, the opening 330 may be inset from the top edge 305. In one embodiment, the opening 30 is surrounded by sensor electrodes on all sides. The opening 330 may extend across a group of one or more rows from the top edge 305. In FIG. 3A, the opening 330 extends across Row 34 and partway across Row 33. In some embodiments, one or more sensor electrodes 363 of the group may be truncated, having a smaller top surface area to accommodate the opening 330. In one embodiment, one or more of sensor electrodes 363 are combined with sensor electrodes of another row. For example, one or more of sensor electrodes 363 may be combined with one or more sensor electrodes of Row 32. FIG. 3A shows several sensor electrodes 363 of Row 33 located adjacent to the bottom edge of the opening 330 and each having a smaller top surface area than other sensor electrodes 364 in the same row or sensor electrodes of other rows which do not accommodate the opening 330.

In some embodiments, the opening 330 extends across several neighboring columns. In other embodiments, the opening 330 may extend partway across one or more columns. In such embodiments, one or more of sensor electrodes 365 may be truncated.

The shape and/or size of sensor electrodes 304 in one or more rows and columns proximate opening 330 will be described in the following in more detail, In various embodiments, the input device may include a non-sensing portion 303 disposed at the bottom portion of the input device. In some embodiments, the non-sensing portion 303 is arranged between a bottom edge 306 of the area 302 and a bottom edge 308 of the input device. In some embodiments, the row of the array furthest from the top edge 305 defines the bottom edge 306 of the area 302, and the non-sensing portion 303 may not extend beyond the bottom edge 306 into the area 302. In some embodiments, the non-sensing portion 303 corresponds to a non-display portion of the input device. In some embodiments, the material of the non-sensing portion 303, such as a glass material and other suitable material, may be used for mounting chip-on-glass (COG), connecting a flexible printed circuit (FPC), or connecting flex for chip-on-film (COF). In other embodiments, the non-sensing portion 303 may be omitted. In embodiments where there is no or nearly no non-sensing portion 303, the area 302 may extend from the top edge 305 to the bottom edge 308 of the input device.

In various embodiments, each sensor electrode 304 of the array is coupled through a respective one or more of a plurality of vias 355 with a respective one or more of a plurality of routing traces 320. The plurality of routing traces 320 may be coupled with the processing system 110 or the sensor module 204 through a plurality of output pads 350, which in some embodiments is arranged in the non-sensing portion 303.

For simplicity, not all of the vias 355 and/or routing traces 320 have been illustrated for the various sensor electrodes 304 of the array. For example, in various embodiments, each routing trace is coupled to a corresponding sensing electrode through multiple vias. In one embodiment, the plurality of sensor electrodes 304 is formed in a first layer of a substantially transmissive material, such as ITO, and the plurality of routing traces 320 are formed of a metal material in a second layer disposed beneath the first layer(relative to an input surface of the input device). In one or more embodiments, the plurality of traces 320 are formed within one or more metal layers of a display. In various embodiments, each of the plurality of routing traces 320 may have a common length. For example, a routing trace coupled to a sensor electrode 304 proximate the bottom edge 306 of the area 302 and a routing trace that is coupled to a sensor electrode 304 proximate the top edge 305 may extend under a similar number of sensor electrode rows.

In some embodiments, vias 355 and/or routing traces 320 are spaced furthest from a side edges of the at least one opening 330. Further, the routing traces 320 may not extend under the at least one opening 330. In one or more embodiments, one or more routing traces 320 extend from the processing system 110 to connect with the truncated sensor electrodes 304 through a corresponding via 355. In such cases, and consistent with the discussion below, the routing traces 320 and/or vias 355 for a particular truncated sensor electrode 304 may be arranged according to a predefined direction D1, D2 to increase a distance from the routing traces 320 and/or vias 355 to an edge of the opening 330.

In various embodiments, each column of the array corresponds to a respective plurality or a respective subset of vias 355 and to a respective plurality or a respective subset of routing traces 320. In some embodiments, each plurality or subset of vias 355 is arranged with a respective direction across the corresponding column in the X-direction. The respective direction may be selected from a predefined first direction D1 and a predefined second direction D2. The first direction D1 and the second direction D2 may be referenced to a predefined scan sequence of sensor electrodes 304. For example, to sequentially scan the sensor electrodes 304 from top to bottom (Rows 34, 33, . . . , 1), the routing traces 320 of a column with vias 355 arranged in the first direction D1 are sequentially driven from right to left. To perform a top-to-bottom scan of sensor electrodes 304 for another column with vias 355 arranged in the second direction D2, the corresponding routing traces 320 are sequentially driven from left to right.

In some embodiments, for a plurality of vias 355 that are arranged in the first direction D1, a right-most via is in a row that is adjacent to the top edge 305 (also referred to herein as a first row), and a left-most via is in a row that is furthest from the top edge 305 (also referred to herein as a second row). In FIG. 3A, the first and second rows are indexed as Row 34 and Row 1, respectively. For a plurality of vias 355 that are arranged in the second direction D2, a left-most via is in the first row (i.e., Row 34), and a right-most via may be in the second row (i.e., Row 1). As shown, the vias 355 may be arranged at about a midpoint of the row in the Y-direction.

In some embodiments, due to the presence of the first corner feature 315-1 and the second corner feature 315-2, it may be infeasible to arrange the vias corresponding to the columns proximate side edge 310-1 and/or side edge 310-2 in the same direction as that of the vias disposed proximate center line 345. For example, it may be infeasible to arrange the vias corresponding to column 18 in the second direction D2 or to arrange the vias corresponding to column 1 in the first direction D1, as a via in one or more mores rows may fall outside the area 302 due to the corner features. As such, the vias corresponding to column 18 may be disposed in the first direction D1 while the vias corresponding to column 17 are disposed in the second direction D2. Further, the vias corresponding to column 1 are disposed in the second direction D2 and the vias corresponding to column 2 are disposed in the first direction. Additionally, arranging vias 355 away from the corner features can provide increased mechanical reliability and higher yield of the input device.

In some embodiments, for at least a column that is adjacent to the first side edge 310-1 (also referred to herein as a first column), a corresponding plurality of vias 355 (also referred to herein as a first plurality of vias) are arranged in the first direction D1 For at least a column that is adjacent to the second side edge 310-2 (also referred to herein as a second column), a corresponding plurality of vias 355 (also referred to herein as a second plurality of vias) are arranged in the second direction D2. In FIG. 3A, the first and second columns are indexed as Column 18 and Column 1, respectively.

In this way, a via 355 (also referred to herein as a first via) of h first plurality of vias 355, which is located in the first column and row (Column 18, Row 34), is further from the first corner feature 315-1 than if the first plurality of vias 355 were arranged in the second direction D2. Similarly, a via 355 (also referred to herein as a second via) of the second plurality of vias 355, which is located in the second column and row (Column 1, Row 34), is further from the second corner feature 315-2 than if the second plurality of vias 355 were arranged in the first direction D1.

In the embodiments shown in FIG. 3A, Column 17 has a plurality of vias 355 arranged in the second direction D2 and Column 2 has a plurality of vias 355 arranged in the first direction D1. In some alternate embodiments, groups of more than one column adjacent to the first side edge 310-1 and/or to the second side edge 310-2 may have corresponding vias 355 arranged with the same direction. In an arrangement 370 depicted in FIG. 3B, two columns (Columns 17, 18) adjacent to the first side edge 310-1 have vias 355 arranged in the first direction D1, and two columns (Columns 1, 2) adjacent to the second side edge 310-2 have vias 355 arranged in the second direction D2.

Although the first direction D1 and the second direction D2 have been described corresponding to a top-to-bottom scan of sensor electrodes 304, other arrangements of the plurality of vias 355 are also possible. For example, the plurality of vias 355 may be arranged such that the corresponding routing traces 320, when driven according to a predefined left-to-right or right-to-left sequence, scan the sensor electrodes 304 of the column in a sequence other than top-to-bottom. Further, the routing traces 320 for a particular column need not be driven in a strictly left-to-right or right-to-left sequence.

As mentioned above, one or more openings 330 may be formed in the area 302 proximate to the top edge 305. In some embodiments, to accommodate the one or more openings 330, a column adjacent to the opening 330 on a first side closer to the first side edge 310-1 (also referred to herein as a third column) corresponds to a plurality of vias 355 (also referred to herein as a third plurality of vias) that are arranged in the second direction D2. Additionally, a column adjacent to the opening 330 on an opposing second side closer to the second side edge 310-2 (also referred to herein as a fourth column) corresponds to a plurality of vias 355 (also referred to herein as a fourth plurality of vias) that are arranged in the first direction D2. In FIG. 3A, the third and fourth columns are indexed as Column 12 and Column 7, respectively. In this way, a via 355 (also referred to herein as a third via) of the third plurality of vias 355, which is located in the third column and the first row (Column 12, Row 34), is further from the opening 330 than if the third plurality of vias 355 were arranged in the first direction D1. Similarly, a via 355 (also referred to herein as a fourth via) of the fourth plurality of vias 355, which is located in the fourth column and the first row (Column 7, Row 34), is further from the opening 330 than if the second plurality of vias 355 were arranged in the first direction D1.

In some embodiments, whether or not the one or more openings 330 are formed in the area 302, an arrangement of the plurality of vias 355 across the entire area 302 is symmetrical about a center line 345 of the sensor electrodes 304. In one embodiment, opening 330 may be centered about center line 345. In other embodiments, opening 330 may be positioned substantially left of or right of center line 345. The center line 345 of the area 302 may coincide with a middle of the display screen or the display panel, which is in X-direction in the embodiments of FIG. 3A. In the embodiments shown in FIG. 3A, the left half of the area 302 from the center line 345 has the arrangement where the plurality of vias 355 in Column 18 are in the first direction D1 while the respective plurality of vias 355 from Column 17 to the columns adjoining the center line 345 are in the second direction D2. As the center-symmetric arrangement with respect the left side arrangement, the right half of the area 302 from the center line 345 has the arrangement where the plurality of vias 355 in Column 1 are in the first direction D2 while the respective plurality of vias 355 from Column 2 to the columns adjoining the center line 345 are in the second direction D1. Further, the arrangement 370 shown in FIG. 3B may also have the center-symmetric arrangement about a center line (not shown).

The plurality of routing traces 320 may be coupled with the processing system 110 or the sensor module 204 of the processing system 110 through, a plurality of output pads 350. Within the area 302, the plurality of routing traces 320 have an orientation that is parallel to an orientation of the columns (in FIG. 3A, along the Y-direction). Although for simplicity, the routing traces 320 are depicted as extending straight into the plurality of output pads 350, embodiments may include a fan-out region for the routing traces 320. Additionally, display electrodes such as source lines may connect with the processing system 110 and extend into the area 302. Thus, the processing system 110 may include additional output pads for coupling with display electrodes. The output pads corresponding to the display electrodes may have an interleaved or non-interleaved arrangement with the output pads 350 coupled: with the routing traces 320. For example, a first group of the output pads 350 may be separated from a second group of the output pads 350 by the entire group of output pads corresponding to the display electrodes. In one embodiment, the output pads 350 may be arranged within non-sensing portion 303. Further, the output pads 350 may be disposed within a common layer with the plurality of routing traces 320 or a layer different from that of the plurality of routing traces 320. For example, the output pads 350 may be disposed on a common side of a display substrate or a different side of a display substrate from the plurality of routing traces 320.

In one or more embodiment, the sensor electrodes 304 are scanned in a consistent manner across the area 302. For example, each column of the area 302 may be sequentially scanned from left to right, and the sensor electrodes 304 of each column may be sequentially scanned from top to bottom. As different columns can correspond to vias 355 that are arranged in different directions, the routing traces 320 for different columns may be driven in different sequences to provide the desired sequential scan of sensor electrode 304, e.g., from top to bottom. In some embodiments, and as further discussed below, the processing system 110 is configured to select a predefined direction or other predefined scan sequence for driving the routing traces 320 of a particular column to accommodate the different arrangements of vias 355.

Exemplary Multiplexing Schemes

Figure 3B:
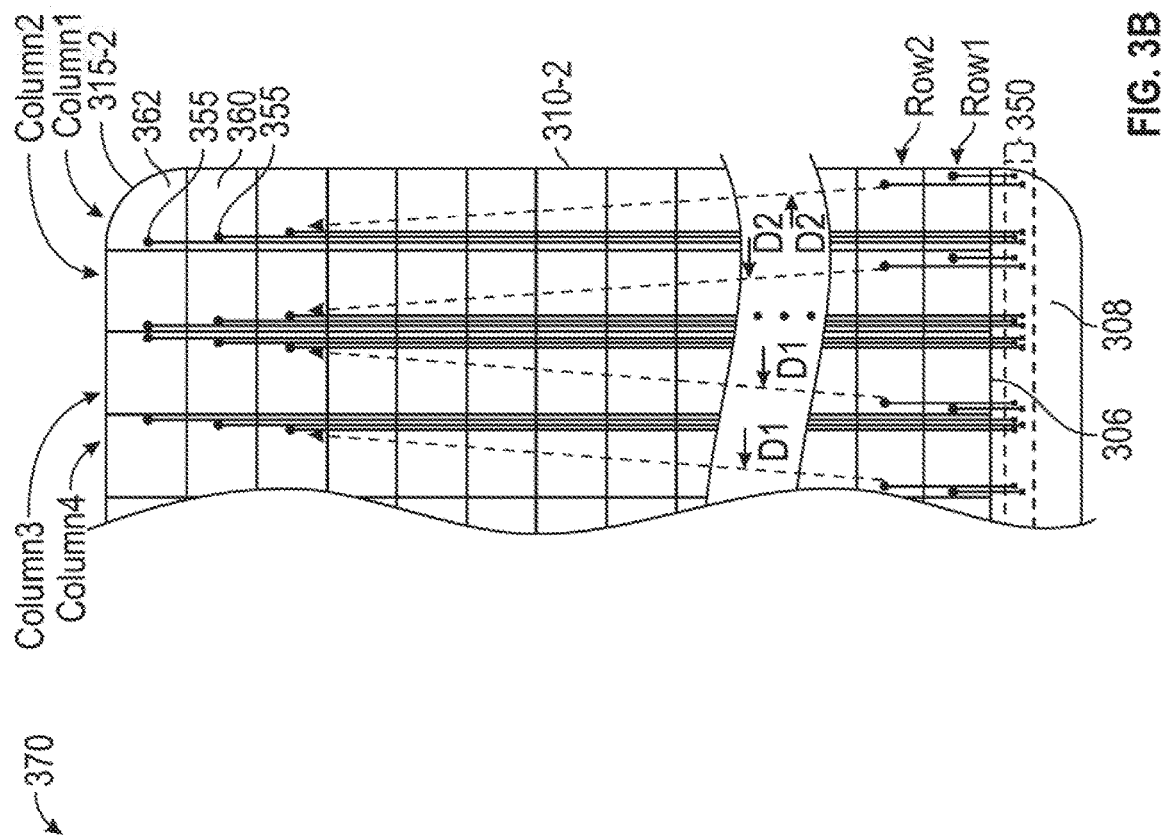
Figure 4:
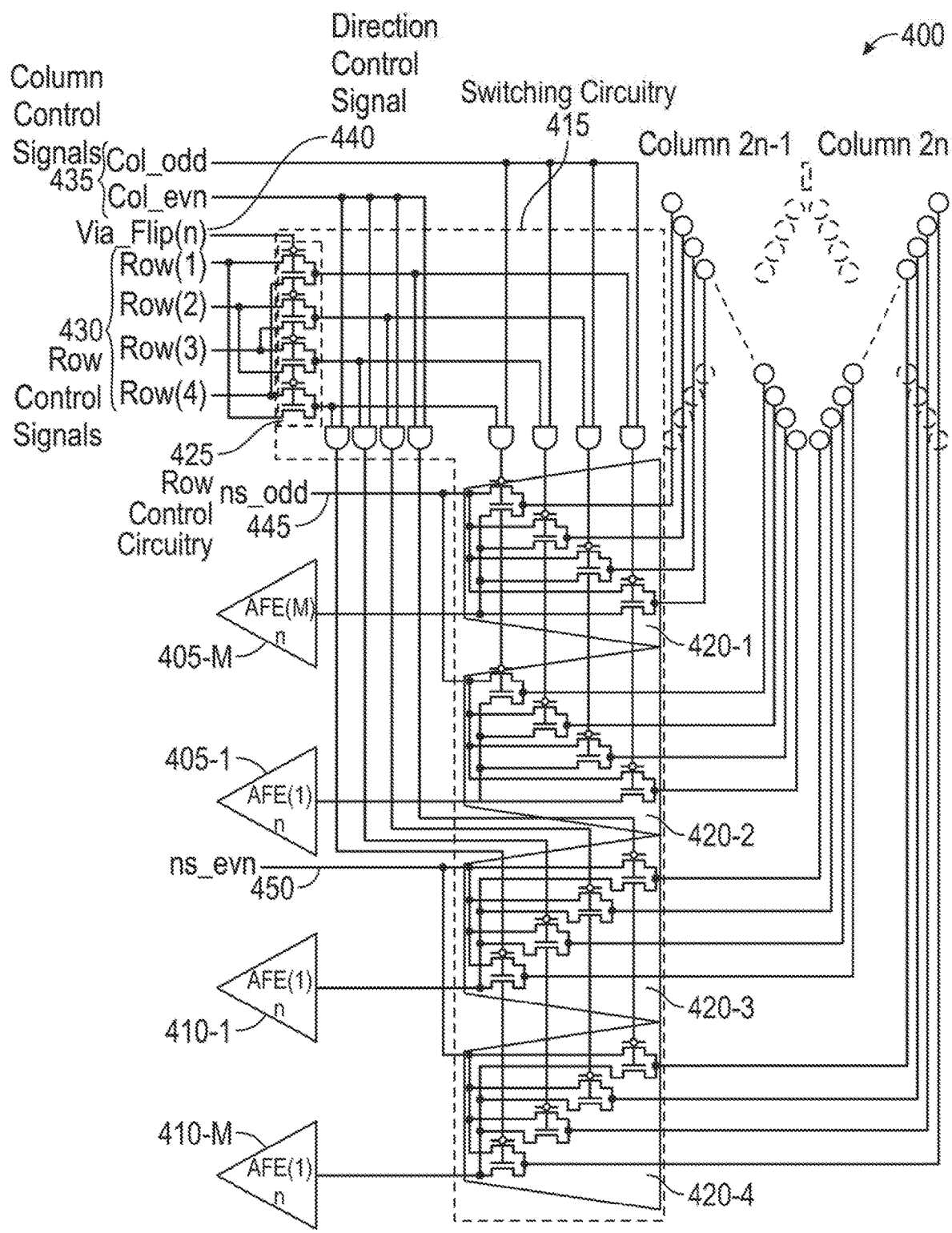
FIG. 4 is a block diagram of a sensor module according to one or more embodiments.

FIG. 4 is a block diagram of an exemplary sensor module 400 multiplexers, according to embodiments described herein. The sensor module 400 may be used in conjunction with other embodiments described herein, such as the input device 100 and processing system 110 depicted in FIG. 1, and the arrangements 300, 370 depicted in FIGS. 3A, 3B. In various embodiments, the sensor module 400 is operable with a plurality of sensor electrodes arranged within an array of rows and columns. In some embodiments, the sensor module 400 comprises at least one analog front-end (AFE), and one AFE is shared among a plurality of sensor electrodes in the same column via at least one multiplexer.

In one or more embodiments, the sensor module 400 comprises a plurality of analog front-ends (AFEs) 405-1 to 405-M and 410-1 to 410-M (generically AFEs 405, 410), each of which is configured to acquire capacitive measurements using one or more coupled sensor electrodes. In some embodiments, each AFE 405, 410 includes an analog-to-digital converter (ADC) of any suitable type, and may further include filtering or other signal conditioning circuitry.

The sensor module 400 may further comprise switching circuitry 415 configured to select which AFEs 405, 410 are connected to which sensor electrodes. The switching circuitry 415 may comprise a plurality of multiplexers 420-1, 420-2, 420-3, 420-4 (generically multiplexer 420) configured to select and couple one of a plurality of sensor electrodes to a respective one of the AFEs 405, 410. In some embodiments, each of the multiplexers 420 is a 4-to-1 multiplexer configured to couple a selected one of four sensor electrodes to a respective AFE 405, 410. Other multiplexer ratios are also possible.

The multiplexers 420 may be configured to select a sensor electrode using a combination of row control signals 430 (row[1], . . . , row[4]) and/or column control signals 435 (col_odd, col_evn). The switching circuitry 415 may comprise row control circuitry 425 that is configured to receive the plurality of row control signals 430 corresponding to a plurality of rows, and output the plurality of the row control signals 430 with an ordering selected based on a direction control signal 440 (VIA_FLIP[n]). The direction control signal 440 may be generated by a processing system, e.g., the processing system 110 in FIGS. 1 and 2. In some embodiments, in one state of the direction control signal 440, the row control signals 430 are applied in the original order, and in the other state of the direction control signal 440, the row control signals 430 are applied in the reverse order. In this way, the sensor module 400 may scan sensor electrodes according to a desired direction, despite different arrangements of vias and/or routing traces as discussed in FIG. 3. For example, the original order of the direction control signal 440 and the row control signals 430 may be used to scan through sensor electrodes 304 having vias 355 disposed in the first direction D1 and the reverse order of the direction control signal 440 and the row control signals 430 may be used to scan through sensor electrodes 304 having vias 355 disposed in the second direction D1.

In the embodiment of FIG. 4, a single APE 405, 410 is shared between four electrodes from the same column, and selection is controlled using four row control signals 430. The order in which the row control signals 430 are asserted determines the scan direction within this subset of sensor electrodes in the column. In some embodiments, other non-sensing electrodes (i.e., electrodes that are not routed to AFEs 405, 410) are routed to a first signal 445 ("ns_odd") for odd-indexed columns or a second signal 450 ("ns_evn"), for even-indexed columns.

Figure 3B:
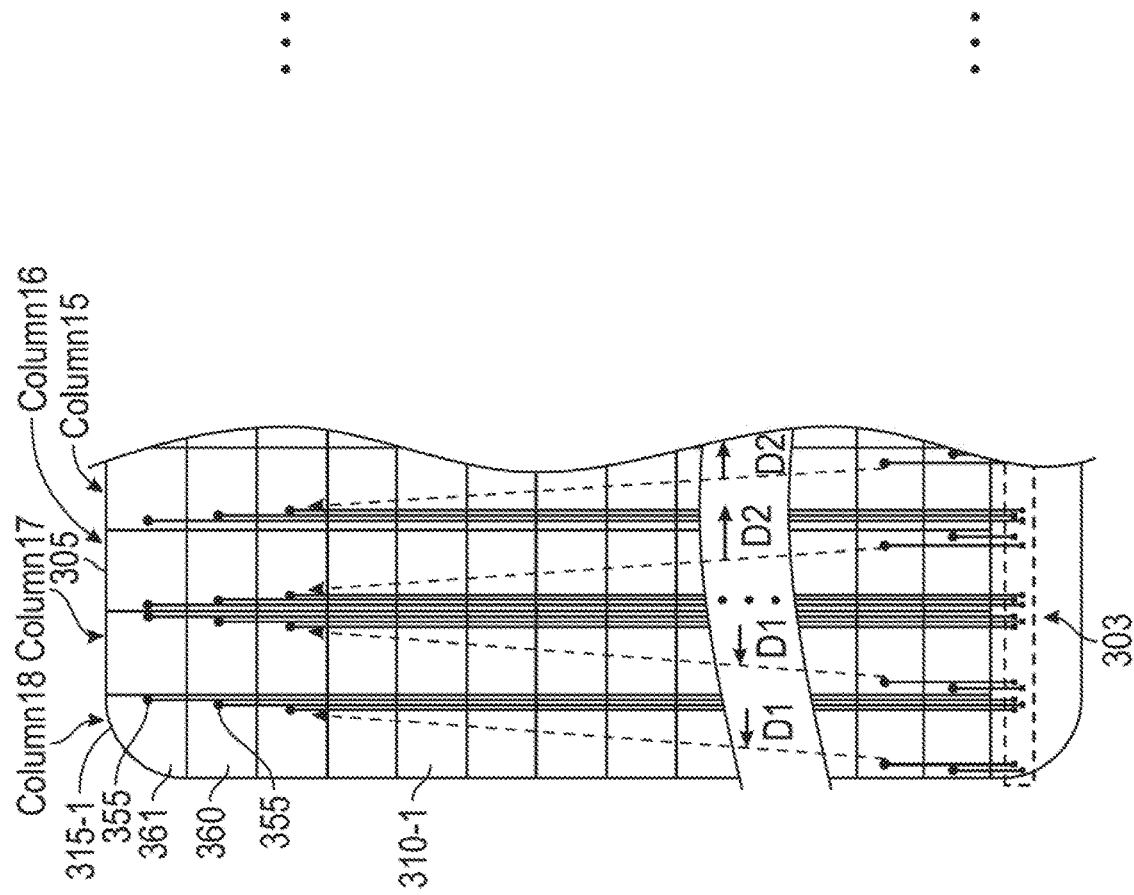

In some embodiments where arrangements of routing traces differ for different columns, for example as in the arrangement 300 of FIG. 3A and the arrangement 370 of FIG. 3B, driving the routing traces of different columns in the same way can result in different scan patterns. For example, a scan direction in one column may be bottom-to-top, and a scan direction in another column may be top-to-bottom. However, by introducing another level of control using the direction control signal 440 for two adjacent columns or a pair of columns (Column 2n-1 and Column 2n), which applies a swap on the original row control signals 430, the scan direction can be made consistent between column to another having a reversed arrangement of vias. For example, a swap on the original row control signals 430 may be used to have a consistent scan direction between columns 18 and 17 and between columns 1 and 2 of FIG. 3A, and between columns 17 and 16 and between columns 3 and 2 of FIG. 3B. In one or more embodiments, for the pair of columns, when VIA_FLIP[n] is asserted, the sensor electrode corresponding to the left-most via connection is controlled through row [4], and the sensor electrode corresponding to the right-most via connection is controlled through row [1]. When VIA_FLIP[n] is de-asserted, the sensor electrode with the left-most via connection is controlled through row [1], and the sensor electrode corresponding to the right-most via connection is controlled through row [4].

In other embodiments, the scan direction may be controlled for each individual column instead of each pair of columns or multiple columns. However, to accommodate flexibility of via location with respect to irregular features of the display, such as a corner feature and an opening located in an area defined by the sensor array, e.g., the corner features 315-1, 315-2 and the opening 330 in FIG. 3A, a direction control signal 440 may be provided per column pair when the corresponding circuitry of sensor module 400 is symmetrical. For example, the NMOS and PMOS switches included in the multiplexers 420 are symmetrical between Column $2n-1$ and Column $2n$, which halves the number of control signals required, as the NMOS and PMOS switches turn on using symmetric voltages. More specifically, for 2N number of columns, only N direction control signals 440 (as VIA_FLIP[1:N]) are needed.

In some embodiments, when the edge of the glass cutout at an opening falls between Column $2n-1$ and Column $2n$, e.g., column 11-12 and column 7-8, a preferred arrangement of the vias forms a "V" shape, where the top-most sensor electrodes are connected through the left-most vias in Column $2n-1$ and through the right-most vias in Column $2n$. For a predefined sensor electrode scan direction from bottom-to-top, VIA_FLIP[n] is set at a logic low state.

In some embodiments, when the edge of the glass cutout falls to the left of Column $2n-1$, e.g., column 7-6, or to the right of Column $2n$, e.g., column 13-12, the via arrangement forms a "Λ" (lambda) shape, where the same top-most sensor electrodes are connected through the right-most vias in Column $2n-1$ and through the left-most vias in Column $2n$. To maintain the same bottom-to-top scan direction, VIA_FLIP[n] is now set at a logic high level.

Figure 5:
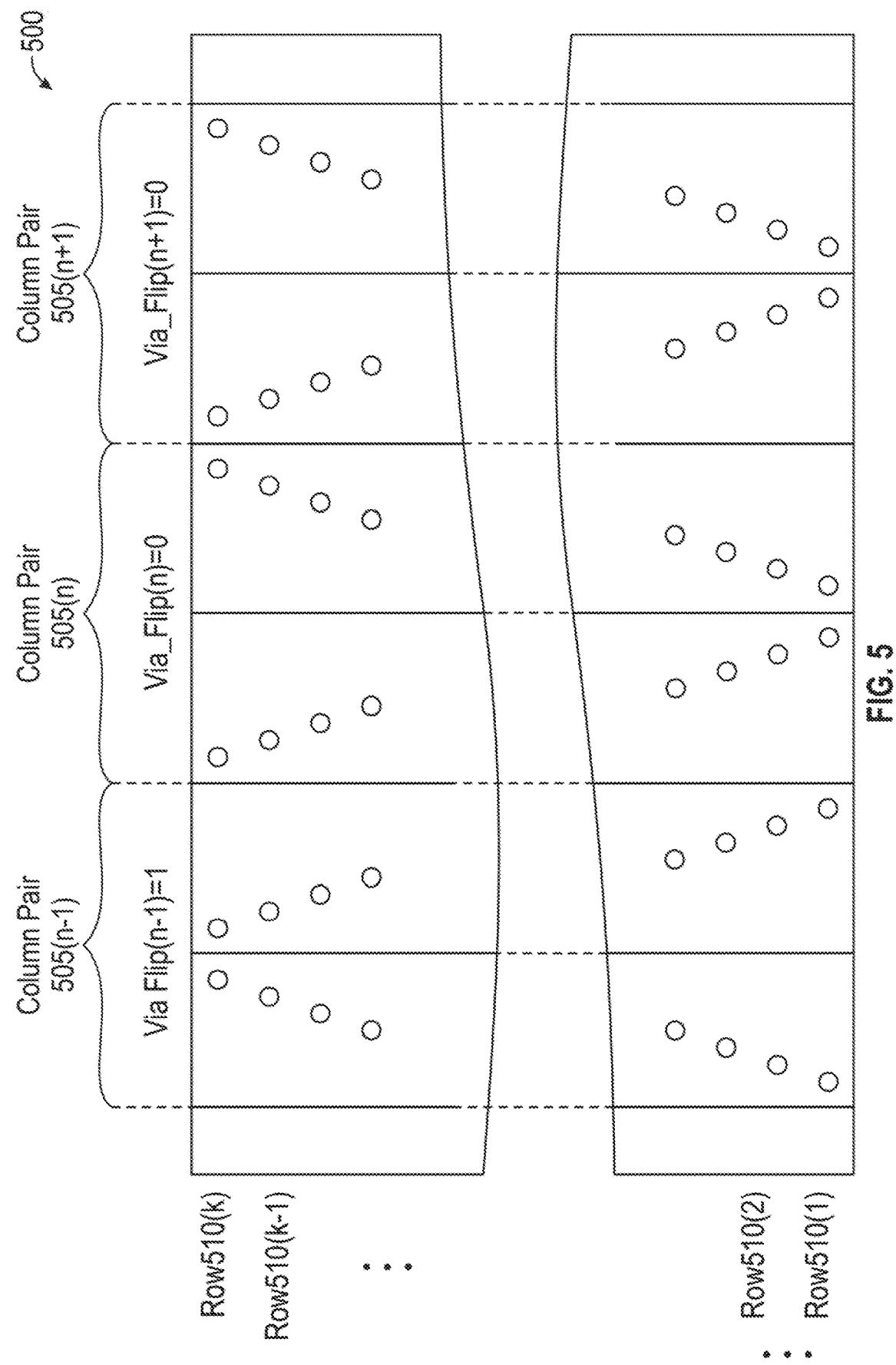
FIG. 5 illustrates scan direction control for a plurality of columns sensor electrodes, according to one or more embodiments.

Diagram 500 of FIG. 5 illustrates various example scan directions for different columns pairs. For a first column pair 505($n-1$), a corresponding direction control signal VIA_FLIP[n-1] is at a '1' level. The first column pair 505(N-1) may refer to columns 18 and 17 of FIG. 3A columns 17 and 16 of FIG. 3B. For the first column pair 505($n-1$), the "1" level corresponds to a bottom-to-top scan direction (row 510(1), (2), . . . , (K-1), (K)). In a second column pair 505($n$) and a third column pair 505($n+1$), corresponding direction control signals VIA_FLIP[n], [n+1] are at a "0" level also corresponding to a bottom-to-top scan direction. The second column pair 505(N) and third column pair 505(N+1) may correspond to columns 9 and 10 of FIG. 3A.

Figure 6:
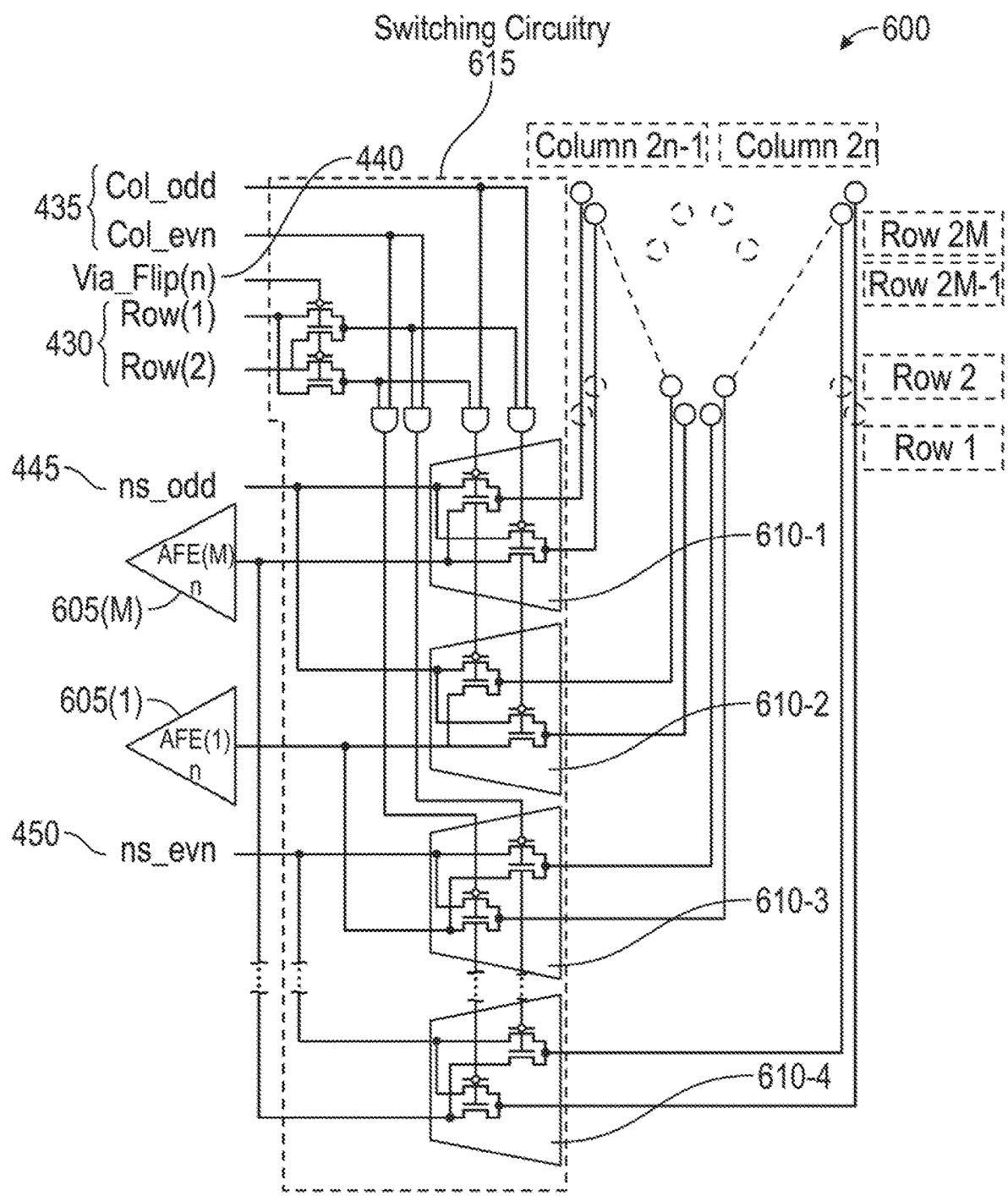
FIG. 6 is a block diagram of a sensor module according to one or more embodiments.

FIG. 6 is a block diagram of an exemplary sensor module 600 having 4-to-1 multiplexers, according to embodiments described herein. The sensor module 600 may be used in conjunction with other embodiments described herein, such as the input device 100 and processing system 110 depicted in FIG. 1, and the arrangements 300, 370 depicted in FIGS. 3A, 3B. In some embodiments, the sensor module 600 is operable with a plurality of sensor electrodes arranged within an array of rows and columns.

In one or, more embodiments, the sensor module 600 comprises a plurality of analog front-ends (AFEs) 605-1 to 605-M (generically AFEs 605), each of which is configured to acquire capacitive measurements from one or more coupled sensor electrodes. The sensor module 600 may further comprise switching circuitry 615 configured to select which AFEs 605 are connected to which sensor electrodes. The switching circuitry 615 may comprise a plurality of multiplexers 610-1, 610-2, 610-3, 610-4 (generically multiplexer 610) configured to select and couple one of a plurality of sensor electrodes to a respective one of the AFEs 605. In some embodiments, each of the multiplexers 610 is a 2-to-1 multiplexer configured to couple a selected one of two sensor electrodes to a respective AFE 605.

The multiplexers 610 may be configured to select a sensor electrode using a combination of row control signals 430 (row[1], [2]) and/or column control signals 435 (col_odd, col_evn). The switching circuitry 615 may comprise row control circuitry that is configured to receive the plurality of row control signals 430 corresponding to a plurality of rows, and output the plurality of the row control signals 430 with an ordering selected based on a direction control signal 440 (VIA_FLIP[n]). The direction control signal may be generated by a processing system, e.g., the processing system 110 in FIGS. 1 and 2.

In some embodiments, each AFE 605 is configured to be selectively connected with sensor electrodes from Column $2n-1$ and Column $2n$. The direction control signal VIA_FLIP[1:N] operates to control the scan direction, and the circuit symmetry occurs within a set of sensor electrodes belonging to the same AFE 605. The NMOS and PMOS switches within the multiplexers 610 are symmetric between the first two electrodes of Column $2n-1$ and the second two electrodes of Column $2n$ going into the same AFE 605.

In one or more embodiments, the sensor module 600 provides an efficient use of AFEs that are available during transcapacitive sensing. In sensor module 600, sensing may be performed on the sensor electrodes of one column using one AFE while driving occurs on the sensor electrodes of other column without requiring the other AFE to sense. Further, as compared to the sensor module 400, for arrangements have a number of rows that is divisible by 2 and not 4, the sensor module 600 improves the granularity of the number of rows supported without requiring the last row assigned to a partial set belonging to the same AFE, as the sensor module 600 couples to the sensor electrodes in multiples of 2 as compared to senor module 400, which couples to the sensor electrodes in multiples of 4. Additionally, the sensor modules 400 and 600 allow for the use of a common AFE simultaneously across multiple sensor electrodes (effectively shorting those sensor electrodes together), far-field or proximity image sensing may be improved.

Exemplary Sensor Electrode Patterns

Figure 7:
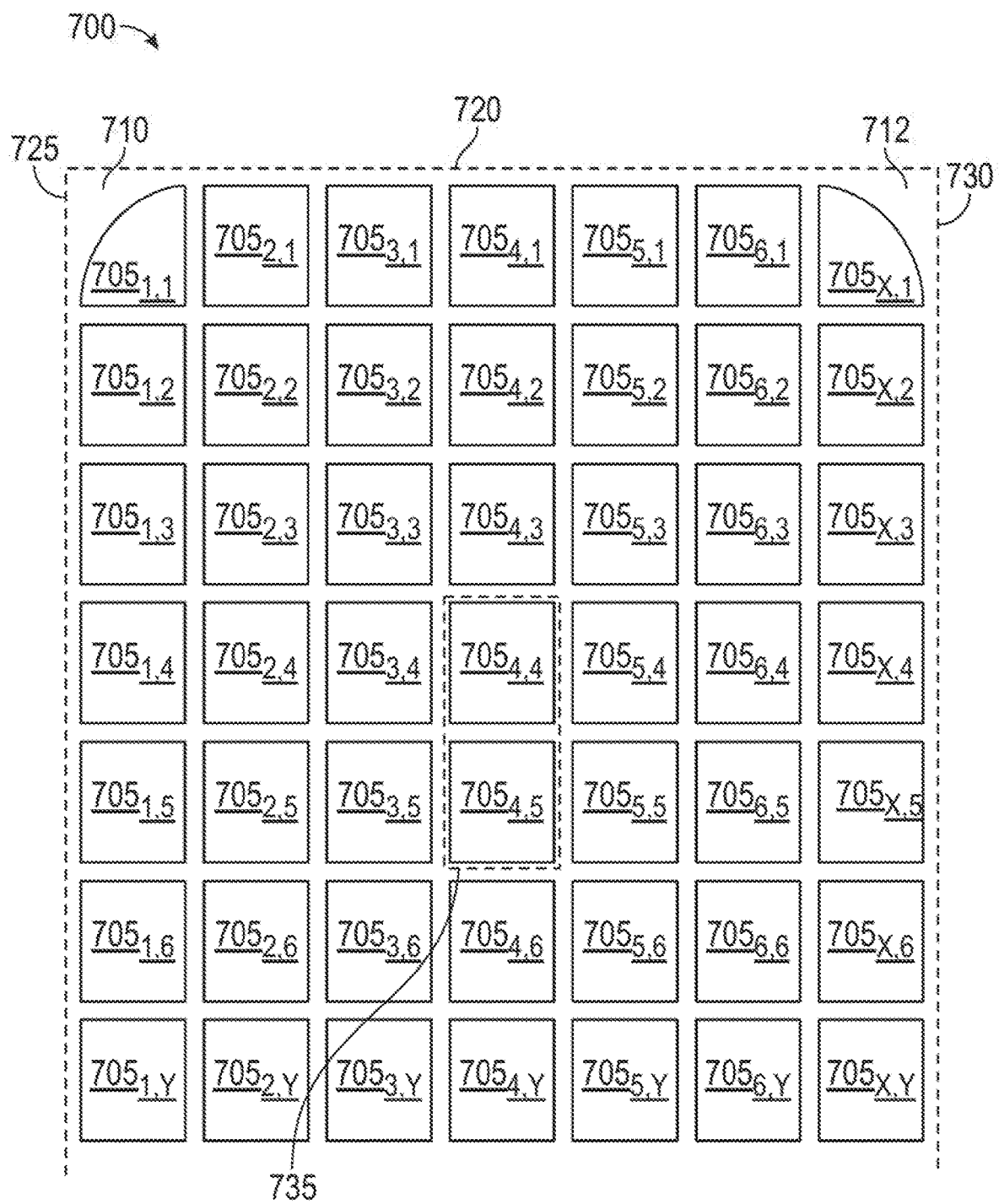
FIG. 7 illustrates a sensor electrode arrangement, according to one or more embodiments.

FIG. 7 illustrates sensor electrode pattern 700 having sensor electrodes 705 disposed in an array of columns and rows configured to sense in a sensing region associated with a pattern, according to some embodiments. As described with regard to FIG. 2, the sensor electrodes 705 may be communicatively coupled to processing system 110. Processing system 110 may operate the sensor electrodes 705 in a transcapacitive sensing mode or an absolute capacitive sensing, mode to determine positional information for input objects within sensing region 120. In one embodiment, processing system 110 operates the sensor electrodes 705 using a combination of transcapacitive and absolute capacitive sensing modes to determine positional information for input objects within sensing region 120.

In various embodiments, the array defines an area having top edge 730 and side edges 725 and 730. The area may be a substantially contiguous area. The top edge 720 and side edges 725 and 730 are connected with the top edge at corner regions 710 and 712, respectively.

In one embodiment, sensor electrodes $705_{1,1}$ and $705_{X,1}$ are disposed proximate corner regions 710 and 712, respectively. In one embodiment, the corner region includes a rounded corner with a convex shape. In other embodiments, the corner region may include other shapes. Sensor electrodes $705_{1,1}$ and $705_{X,1}$ may have a shape corresponding to corner regions 710 and 712. In another embodiment, sensor electrodes $705_{1,1}$ and $705_{X,1}$, have a shape different than that of corner regions 710 and 712. For example, the corner region may have a rounded shape, but the sensor electrodes $705_{1,1}$ and $705_{X,1}$ may have a linear shape.

As illustrated in FIG. 7, the sensor electrodes $705_{1,1}$ and $705_{X,1}$ may be different in at least one of size and shape from that of a sensor electrode, sensor electrode $705_{4,4}$ and/or sensor electrode $705_{4,5}$ proximate a center region, e.g. region 735, of the sensor electrode pattern 700. In one embodiment, the sensor electrodes $705_{1,1}$ and $705_{X,1}$ are different in both size and shape from sensor electrodes $705_{4,4}$ and/or $705_{4,5}$. For example, the sensor electrodes $705_{1,1}$ and/or sensor electrode $705_{X,Y}$ may differ from sensor electrode $705_{4,4}$ and/or sensor electrode $705_{4,5}$ in at least one of top surface area and center-of-mass relative to a corresponding top surface area of each sensor electrode.

Figure 8:
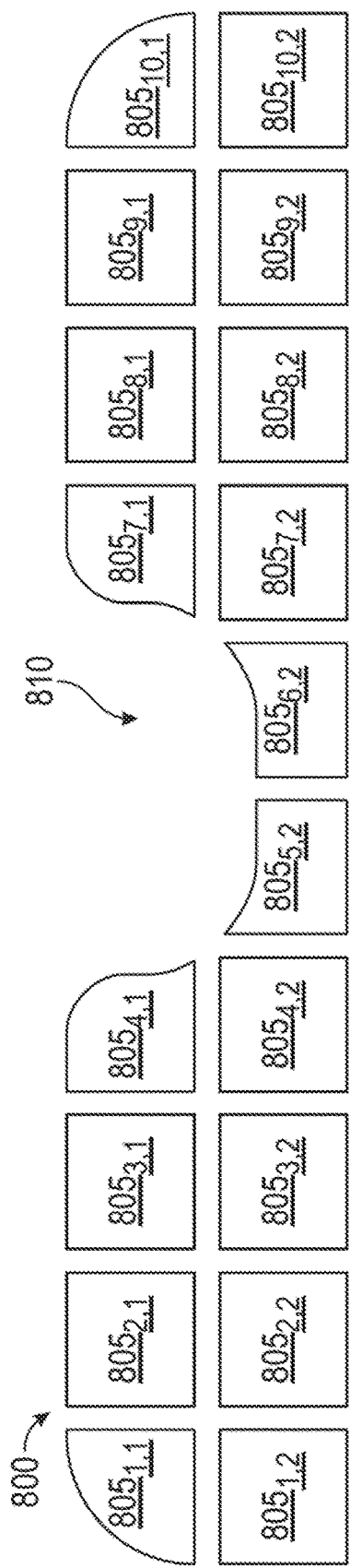
FIG. 8 illustrates a portion of a sensor electrode arrangement, according to one or more embodiments

FIG. 8 illustrates a portion of sensor electrode pattern 800 having sensor electrodes 805 and an opening comprising a notch region 810, according to one or more embodiments. Sensor electrodes 805 may be communicatively coupled to a processing system (e.g., processing system 110) and operated in a transcapacitive sensing mode and/or an absolute capacitive sensing mode to determine positional information for input objects within a sensing region (e.g., sensing region 120). Sensor electrodes $805_{4,1}$, $805_{5,2}$, $805_{6,2}$, and $805_{7,1}$ are disposed proximate notch region 810 and have a side with one or more curved portions corresponding to the shape of notch region 810. In one or more embodiments, the sensor electrodes $805_{4,1}$, $805_{5,2}$, $805_{6,2}$, and $805_{7,1}$ may have a single curved portion. As is mentioned earlier, one or more of a speaker, camera, and sensing device (e.g., IR sensor) may be disposed within notch region 810.

Notch region 810 may correspond to a cutout formed in array of sensor electrodes. In one or more embodiments, not region 810 corresponds to a cutout of the display device. For example, not region 810 may corresponds to a cutout in one or more of the glass layers of the display device.

Figure 9:
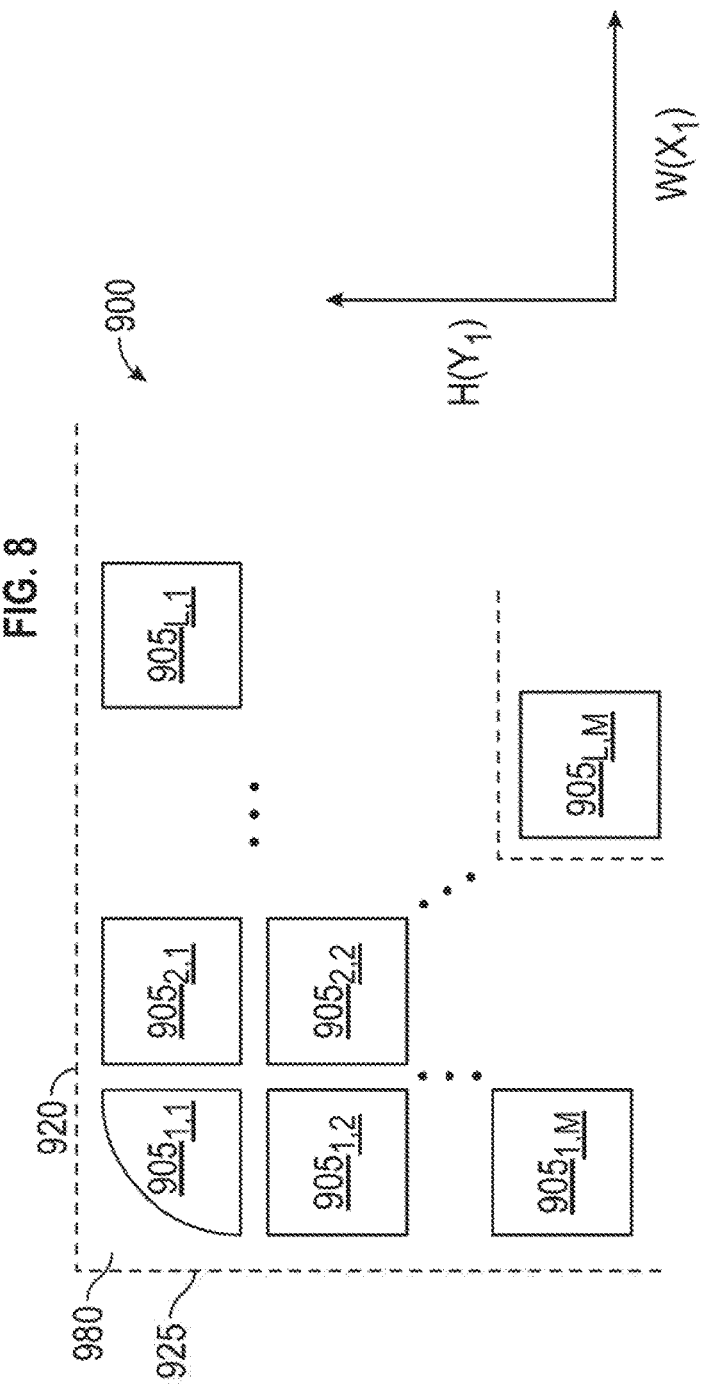
FIG. 9 illustrates a portion of a sensor electrode arrangement, according to one or more embodiments.

FIG. 9 illustrates a portion of sensor electrode pattern 900 according to some embodiments. The sensor electrode pattern 900 includes sensor electrodes 905 having varying sizes and shapes. The size of the sensor electrodes across sensor electrode pattern 900 may be varied to balance measurements of changes in capacitance from each of the sensor electrodes. In some embodiments, the top surface area of the sensor electrode corresponds to the amount of the change of capacitance determined from each of the sensor electrodes. As such, electrodes with smaller areas will have a smaller change in capacitance as compared to sensor electrodes with larger areas. With reference to FIG. 7, sensor electrode $705_{4,4}$ has a smaller area than that of sensor electrode $705_{4,4}$, and the change in capacitance determined from sensor electrode $705_{1,1}$ will be smaller than that of $705_{4,4}$ for the same sized input object. By increasing the top surface area the sensor electrodes, a corresponding measured change in capacitance of each of those sensor electrodes is also be increased. Further, by decreasing the differences in area between the sensor electrodes, the differences in measured changes in capacitances across the sensing electrode pattern may be decreased, equalizing the response of the sensor electrodes in the sensor electrode pattern.

In one embodiment, one or more sensor electrodes have a curved side and a reduced area as compared to other sensor electrodes. Further, those sensor electrodes may also have a different center-of-mass than one or more other sensor electrodes. In various embodiments, the center-of-mass is used to determine the location of an input object with reference to the sensor electrodes, and if the center-of-mass differs, the location of the input objects may be incorrectly determined. Further the center-of-mass is relative to the top surface area of each electrode.

In various embodiments, the sensor electrodes are comprised of display electrodes, and as such, the orientation of the sensor electrodes corresponds to the gate lines, the source lines, and the subpixel boundaries of the display device. In such embodiments, sensor electrodes having different areas may cause a varying brightness across the display. However, by varying the width and height of the sensor electrodes to create sensor electrodes with similar areas, the display brightness may be balanced in addition to the responsiveness of the sensor electrodes across the sensor electrode pattern.

In the embodiment of FIG. 9, the geometric irregularity of corner electrodes (sensor electrode $905_{1,1}$) may be obscured by varying the sensor electrode heights and widths (pitch sizes), gradually, across the sensor electrode pattern. For example, the height of the sensor electrodes may vary along each column of sensor electrodes from a center region (e.g. center region 935) to a top and/or bottom edge. The width of the sensor electrodes may vary along each row of sensor electrodes from a center region (e.g., center region 935) to a side edge. Further, the height and width of sensor electrodes may vary along a diagonal from a center region (e.g., center region 935) to a corner region (e.g., corner region 940).

In other embodiments, the height and/or width of sensor electrodes may vary across the sensor electrode pattern to account for sensor electrode irregularities disposed at locations other than corner regions of the sensor electrode pattern. For example, in one or more embodiments, the sensor electrode pattern 900 may include a notch region disposed proximate a center of the top edge. Example notch region 810 is illustrated in FIG. 8. In such embodiments, sensor electrodes proximate the notch region may vary in width and/or height as compared to sensor electrodes disposed closer to a center region of the sensor pattern. For example, sensor electrode $805_{5,2}$, sensor electrode $805_{4,1}$, sensor electrode $805_{7,1}$ and sensor electrode $805_{6,2}$ may have a width and/or height that differ from a sensor electrode closer to a center region of the sensor electrode pattern. The height and/or width of the sensor electrodes may gradually increase for at least the sensor electrodes disposed between the notch region and the center region. By varying the height and/or width, the differences in the top surface area between sensor electrodes may be decreased.

In one embodiment, for sensor pitch, sizes $x_k$ and $y_k$, where 'k' is a column/row index starting at a corner of the sensor electrode pattern, the sensor size may gradually vary across the sensor electrode pattern. The gradient pitch $x_k$, $y_k$ may be given by $\sqrt{A_{905_{1,1}}\alpha^{k-1}}$, where $A_{905_{1,1}}$ is the size of sensor electrode $905_{1,1}$ and 'α' is a scale factor indicating the order of gradation. The total sum $\Sigma_{k-1}{}^{N}\sqrt{A_{905_{1,1}}\alpha^{k-1}}$ matches the portion of sensor electrode pattern on which this gradient pitch is applied. N is the number of a sensor electrode row/column within this portion of the sensor electrode pattern, while $A_{905_{1,1}}$ is matched as closely as possible to the total area of this portion divided by $N^2$, or a number of sensor electrodes in this area. For these two conditions, the scale factor 'α' is solved for where $A_{905_{1,1}}$ converges, resulting in a sensor electrode pattern having a sensor pitch with a small gradation. In one embodiment, sensor electrodes disposed along a diagonal of the sensor electrode pattern differ in size by the gradient factor, however, remain of a similar shape. For example, the sensor electrodes along the diagonal may have a square shape, but varying is size. Sensor electrodes along a common row and/or common column may vary in width and/or height and shape based on the gradation factor defined by the scale factor.

In one embodiment, the top surface area of each sensor electrode is at least about 75% of the top surface area of a nominal sensor electrode. The nominal sensor electrode may be a sensor electrode disposed proximate a center region of the senor electrode pattern. For example, the nominal sensor electrode may be sensor electrode $905_{L,M}$ disposed within center region 935. "L" and "M" correspond to the column and row, respectively, of the sensing electrodes. In one embodiment, the top surface area of each sensor electrode is at least about 75% of the top surface area of a nominal sensor electrode and less than or equal to about 125% the top surface area of the nominal sensor electrode. In other embodiments, the top surface area of a sensor electrode may be in the range of 50% to 125% of the top surface area of the nominal senor electrode.

In embodiments where the sensor electrode pattern has one or more sensor electrodes with irregular shapes, the size (area) and center-of-mass metrics are conversely related to each other. For example, increasing the size of sensor electrode $905_{1,1}$ by increasing $x_1$ and $y_1$ to match that of sensor electrodes $905_{2,1}$ and $905_{1,2}$, elongates sensor electrodes $905_{2,1}$ and $905_{1,2}$, or increases the deviation of the corresponding center-of-mass.

As illustrated in FIG. 9, sensor electrode $935_{1,1}$ is disposed proximate a corner region of sensor electrode pattern 900. Further, the sensor electrode 905, has a size and/or shape that differs from sensor electrode $905_{L,M}$, which is disposed proximate a center portion of sensor electrode pattern 900. Further, sensor electrodes $905_{1,2}$, $905_{2,1}$, and $905_{2,2}$ differ in at least one of size and shape from sensor electrode $905_{L,M}$. In one embodiment, the sensor electrodes $905_{1,2}$, $905_{2,1}$, and $905_{2,2}$ differ in both size and shape from sensor electrode $905_{L,M}$.

In one embodiment, the sensor electrodes gradually vary at least one of top surface area and center-of-mass between sensor electrodes disposed proximate a center region 935 of the sensor electrode pattern 900 and sensor electrodes disposed proximate a top edge 920 and a side edge 925 of the sensor electrode pattern. For example, sensor electrodes $905_{1,2}$ and/or $905_{1,M}$ proximate side edge 925 may have a width (W) greater than the width of sensor electrode $905_{L,M}$. Further, the width of sensor electrodes disposed between center region 935 and side edge 925 gradually increases such that a sensor electrode disposed closer to side edge 925 will have a width greater than that of a sensor electrode disposed closer to center region 935. The height of the sensor electrodes disposed closer to side edge 925 may be smaller than sensor electrodes disposed closer to center region 935.

Sensor electrodes proximate top edge 920 have a height greater than that of sensor electrodes disposed closer to center region 935. For example, the height (H) of sensor electrode $905_{2,1}$ is greater than the height (H) of sensor electrode $905_{L,M}$. The height of sensor electrodes may increase gradually from the center region 935 to top edge 920. In other embodiments, the height may increase gradually from top edge 920 to the center region 935. In one or more embodiments, the width (W) of sensor electrodes disposed closer to top edge 920 is less than the width (W) of sensor electrodes proximate center region 935. The width of sensor electrodes may gradually decrease from the center region 935 to top edge 920. In other embodiments, the width may increase gradually from top edge 920 to the center region 935.

Sensor electrode disposed proximate corner region 980 may vary in at least one of width and height from sensor electrodes disposed proximate center region 935 For example, sensor electrodes $905_{1,2}$ and $905_{2,1}$ may have a height (H) and a width (w) greater than the height and width of sensor electrode $905_{L,M}$ disposed proximate the center region 935. In one embodiment, the top surface area of $905_{1,2}$ and $905_{2,1}$ greater than the top surface area of sensor electrode sensor electrode $905_{L,M}$. Further, as sensor electrodes $905_{1,2}$ and $905_{2,1}$ are have a different shape than sensor electrode $905_{L,M}$, the center-of-mass of sensor electrodes $905_{1,2}$ and $905_{2,1}$ relative to their top surface area is different than the center-of-mass of sensor electrode $905_{L,M}$ relative to its top surface area.

In one embodiment, sensor electrodes in a common row with sensor electrode $905_{L,M}$ have a common height. Further, in one embodiment, sensor electrodes in a common column with sensor electrode $905_{L,M}$ have a common width. In other embodiments, sensor electrodes in a common row may have a different width than sensor electrode $905_{L,M}$ and sensor electrodes in a common column may have a different height than sensor electrode $905_{L,M}$. For example, sensor electrode $905_{1,M}$ is in a common row with sensor electrode $905_{L,M}$ and has similar height as sensor electrode $905_{L,M}$; however, the width of sensor electrode $905_{1,M}$ is greater than the width of sensor electrode $905_{L,M}$. Further, in some embodiments, sensor electrode $905_{L,1}$ is in a common column with sensor electrode $905_{L,M}$ and has a similar width as sensor electrode $905_{L,M}$; however, the height of sensor electrode $905_{L,1}$ is greater than the height of sensor electrode $905_{L,M}$. Sensor electrodes disposed along a diagonal from center region 935 toward corner region 940 have a common shape, but may varying size. In one embodiment, the top surface area of each sensor electrode within sensor electrode pattern 900 is at least 75% of the top surface area of sensor electrode $905_{L,M}$.

Figure 10:
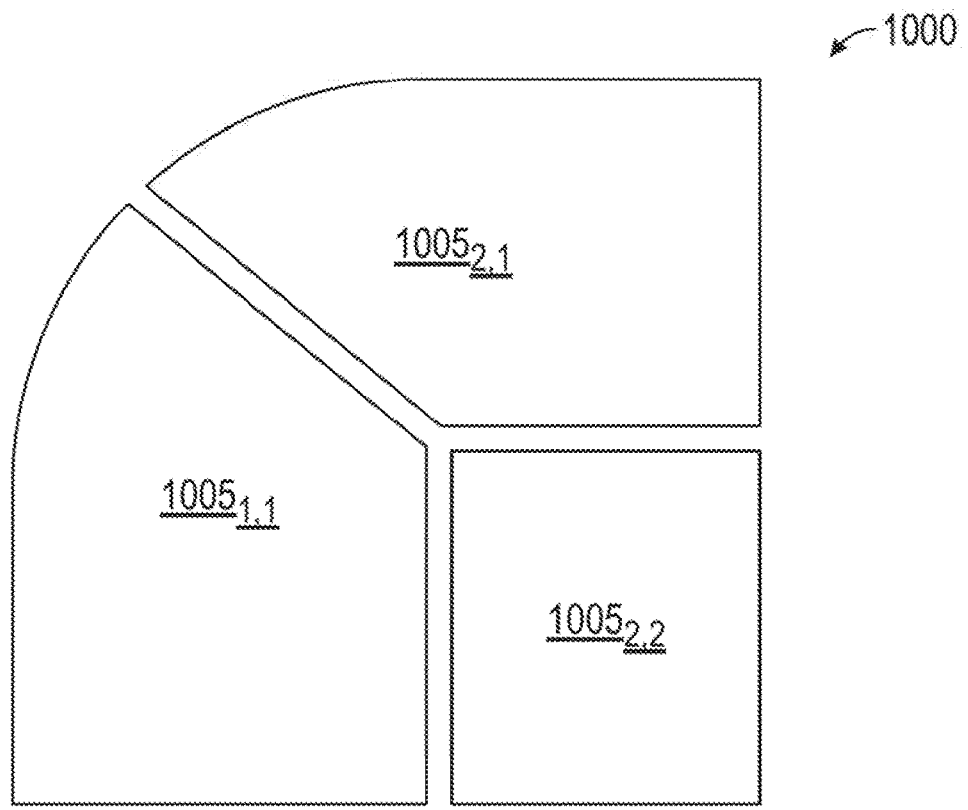
FIGS. 10 and 11 illustrate corner portions of a portion of a serfs electrode arrangement, according to one or more embodiments.
Figure 11:
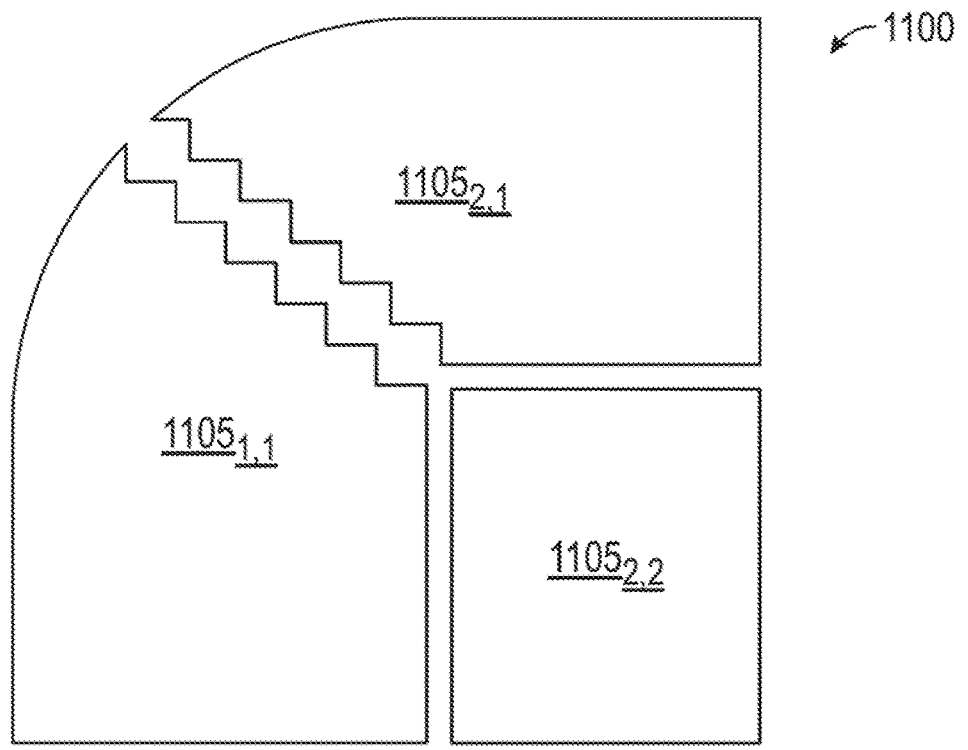

In the embodiments of FIGS. 10 and 11, the corner electrodes are partitioned along a diagonal. As shown in FIG. 10, the corner electrodes $1005_{1,1}$ and $1005_{2,1}$ are partitioned along a straight line. As shown in FIG. 11, the corner electrodes are partitioned along a varying line pattern. In one embodiment, the varying line pattern is a "zig-zag" pattern; however, in other embodiments, other patterns may be utilized. Further, the varying line pattern may correspond to the boundary of subpixels located under the sensor electrodes. In one embodiment, sensor electrode $1005_{1,1}$ and $1005_{2,1}$ have a rounded side and an angled side, where the angled side is at an angle with a top edge of the sensor electrode pattern. The angle may be any angle less than 90 degrees with reference to the top edge. In one embodiment, the angle is a 45 degree angle with reference to the top edge.

Corner sensor electrodes partitioned along a diagonal; divide the corner area into one or more sensor electrodes. For example, the top surface area occupied by sensor electrode $905_{1,1}$ of FIG. 9 is divided equally into sensor electrodes $1005_{1,1}$ and $1005_{2,1}$ or sensor electrodes $1105_{1,1}$ and $1105_{2,1}$. Further, by partitioning the sensor electrodes along a diagonal at the corner, the center-of-mass of the sensor electrodes is further equalized relative to the top surface area of each sensor electrode across the corresponding sensor electrode patterns. In one embodiment, the top surface areas of $1005_{1,1}$ and $1005_{2,1}$ are similar and the top surface areas of $1105_{1,1}$ and $1105_{2,1}$ are similar. In other embodiments, the top surface areas of $1005_{1,1}$ and $1005_{2,1}$ differ and the top surface areas of $1105_{1,1}$ and $1105_{2,1}$. Further, a similar approach to forming corner sensor electrodes as is shown in FIGS. 10 and 11 may be applied to sensor electrodes $805_{4,1}$ and $805_{7,1}$. In such an embodiment, the top surface area of sensor electrode $805_{4,1}$ may be divided into two separate electrodes with a portion of that area being absorbed by sensor electrode $805_{4,2}$ and a portion being absorbed by sensor electrode $805_{3,1}$.

Figure 12:
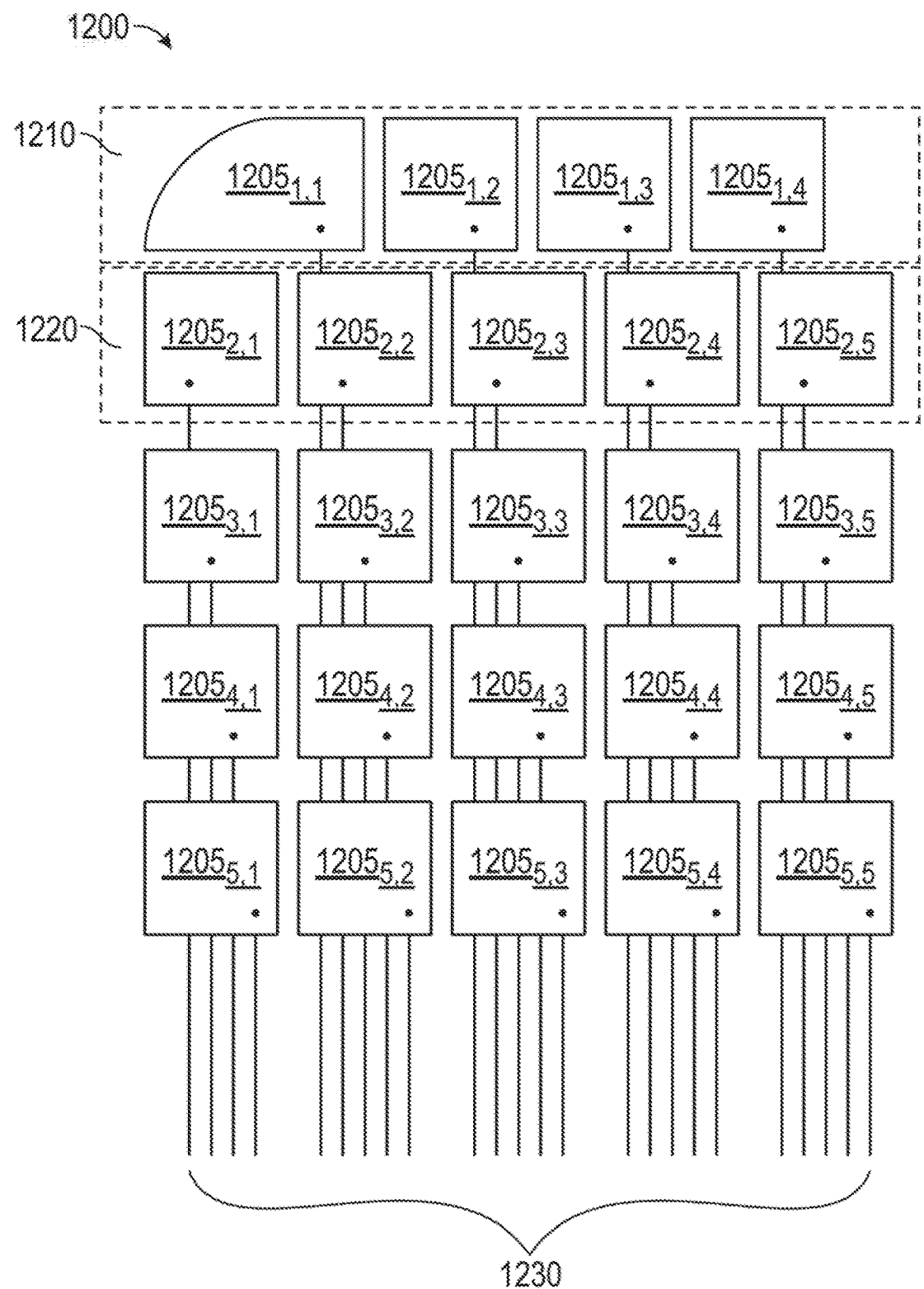
FIGS. 12 and 13 illustrate sensor electrode arrangements, according to one or more embodiments.

FIG. 12 illustrates sensor electrode pattern 1200 having sensor electrodes 1205. As illustrated in sensor electrode pattern 1200, at, least one sensor electrode (e.g., sensor electrode $1205_{1,1}$) has a side that corresponds to a corner region. For example, the sensor electrode $1205_{1,1}$ has a rounded side. Further, the width of sensor electrode $1205_{1,1}$ has been increased to equalize the top surface area of the sensor electrode with respect to the other electrodes within the sensor electrode pattern 1200. In the illustrated embodiment, the width of sensor electrode $1205_{1,1}$ may be set to equalize the top surface area of the sensor electrode $1205_{1,1}$ to a nominal sensor electrode in the sensor electrode pattern. In one embodiment, the nominal sensor electrode is a sensor electrode located near enter region of the sensor electrode pattern.

Each of the sensor electrodes disposed in the first row (row 1210) have a substantially similar area. As illustrated, to equalize the top surface areas among the first row of sensor electrodes, the size of those sensor electrodes with respect to the other sensor electrodes within the sensing pattern is altered. In one embodiment, the width of sensor electrode $1205_{1,1}$ maybe increased, while the width of the other sensor electrodes within the top row may be decreased, decreasing the top surface area of the those sensor electrodes. For example, the top surface area of sensor electrode $1205_{2,1}$, $1205_{3,1}$, and $1205_{4,1}$ may be decreased while the top surface area of sensor electrode $1205_{1,1}$ is increased.

In one embodiment, at least two of the sensor electrodes in row 1210 differ in area. In another embodiment, each of the sensor electrodes in row 1210 differs in area. The top surface area of each sensor electrode in row 1210 is at least about 75% of the top surface area of a nominal sensor electrode, where the nominal sensor electrode may be an unaltered sensor electrode with a nominal area and shape.

Further, the center-of-mass of each sensor electrode relative to their top surface area in row 1210 may differ from the other sensor electrodes in the sensor electrode pattern. The center-of-mass corresponds to the shape of the sensor electrodes and as the width of the sensor electrodes in row 1210 is varied, the center-of-mass may also vary. In one embodiment, the center-of-mass of each sensor electrode in row 1210 relative to their top surface area differs from the center-of-mass of a nominal sensor electrode relative to its top surface area. Further, the center-of-mass for each sensor electrode in the row 1210 relative to their top surface area may be similar or at least one of the sensor electrodes in row 1210 may have a different center-of-mass relative to their surface than that of another sensor electrode in row 1210.

As illustrated, each of the sensor electrodes in row 1210 may be disposed such that they are out-of-phase with sensor electrodes of another row (e.g., row 1220). In one embodiment, out-of-phase sensor electrodes may have their center-of-mass shifted relative to their top surface area as with reference to the center-of-mass of other sensor electrodes relative to their top surface area. For example, each sensor electrode in the row 1210 may overlap at least two sensor electrodes row 1220, such the sensor electrodes of 1210 are staggered with respect to the sensor electrodes of 1230. In one more embodiment, out-of-phase electrodes may be referred to as being positionally offset with one or more sensor electrodes. The amount that the sensor electrodes of row 1210 are out of phase with the sensor electrodes of row 1220 may correspond to width of each sensor electrode of row 1210. In other embodiments, one or more sensor electrodes in other regions of the sensor electrode pattern 1200 vary in top surface area from the other sensor electrodes and may be disposed out-of-phase with at least one other sensor electrode.

Row 1210 includes sensor electrodes $1205_{1,1}$-$1205_{4,1}$. Sensor electrode $1205_{1,1}$ has a rounded side corresponding to a corner region of the sensor electrode pattern. Further, to normalize the top surface areas of the sensor electrodes, the width of sensor electrode $1205_{1,1}$ is greater than the width of at least one other sensor electrode. For example, the width of sensor electrode $1205_{1,1}$ is greater than the width of sensor electrode $1205_{2,1}$ and sensor electrode $1205_{1,2}$. The width of sensor electrodes $1205_{1,2}$-$1205_{1,4}$ may be similar, such that each sensor electrodes has a common top surface area, or the widths may differ, such that at least one sensor electrodes has a different area than another sensor electrode.

In one embodiment, the top surface area of each sensor electrode in row 1210 is at least about 75% of the top surface area of a nominal sensor electrode. In other embodiments, the top surface area of a sensor electrode is the range of 50% to 100% of the top surface area of the nominal senor electrode.

In one or more embodiments, the size: of the sensor electrodes 1205 may gradually vary across the sensor electrode pattern as described with regard to FIG. 9. In such embodiments, one or more rows of sensor electrodes are disposed out-of-phase with another row of sensor electrodes, while the size of the sensor electrodes gradually varies from a center region to an edge of the sensor electrode pattern.

FIG. 12 further illustrates routing traces 1230 coupled to the sensor electrodes 1205 through vias. While the routing traces are shown as having varying lengths, in one embodiment, the length of each routing trace may be similar. As is illustrated in FIG. 12, a first set of routing traces are coupled to sensor electrodes $1205_{2,1}$-$1205_{5,1}$ and a second set of routing traces are coupled to sensor electrodes $1205_{2,2}$-$1205_{5,2}$. Further, the sets of routing traces are coupled to the corresponding sensor electrodes in a substantially uniform pattern. For example, each sensor electrode of row 1220 is symmetrically coupled to corresponding routing traces.

Even though the sensor electrodes of row 1210 are out-of-phase with the sensor electrodes of row 1220, the sensor electrodes of row 1210 are coupled to corresponding routing traces such that symmetric routing of the other sensor electrodes is not interrupted. For example, sensor electrode $1205_{1,1}$ is coupled to a routing trace that is disposed between the routing trace coupled to sensor electrode $1205_{5,1}$ and the routing trace coupled to sensor electrode $1205_{2,2}$. In one embodiment, as compared to the embodiments illustrated in FIGS. 3A and 3B, the routing traces illustrated in the embodiment of FIG. 12 are all disposed along a common direction. In other embodiments, the routing traces illustrated in the embodiment of FIG. 12 may be disposed using similar techniques as illustrated in FIGS. 3A and 3B. In one embodiment, sensor electrode $1205_{5,1}$ is the sensor electrode closest to a bottom edge of the sensor pattern. Further, sensor electrodes $1205_{1,2}$, $1205_{13}$, and $1205_{1,4}$ are coupled to routing traces disposed similar to the routing trace coupled to sensor electrode $1205_{5,1}$. For example, sensor electrode $1205_{1,2}$ is coupled to a routing trace that is disposed between sensor electrode $1205_{5,2}$ and sensor electrode $1205_{2,3}$. Further, sensor electrode $1205_{1,3}$ is coupled to a routing trace that is disposed between sensor electrode $1205_{5,3}$ and sensor electrode $1205_{7,4}$, and sensor electrode $1205_{1,4}$ is coupled to a routing trace that is disposed between sensor electrode $1205_{5,4}$ and sensor electrode $1205_{2,5}$.

In one or more embodiments, routing traces 1230 and corresponding vias may be arranged according to the embodiments illustrated in FIGS. 3A, 3B, and 5, and corresponding description. Further, while each routing trace is illustrated as being coupled to each sensor electrode through a single via, in various embodiments, each routing trace is coupled to each sensor electrode through at least two vias.

In one embodiment corner sensor electrode $1205_{1,1}$ may be formed similar to that of the sensor electrodes illustrated in FIGS. 10 and 11. For example, sensor electrode $1205_{2,1}$ may be altered to include a portion of sensor electrode $1205_{1,1}$ and separate electrode is formed with the other portion of sensor electrode $1205_{1,1}$. The portions may be the same or different sizes. Further, the division between the portions may be on a diagonal as shown in FIGS. 10 and 11.

Figure 13:
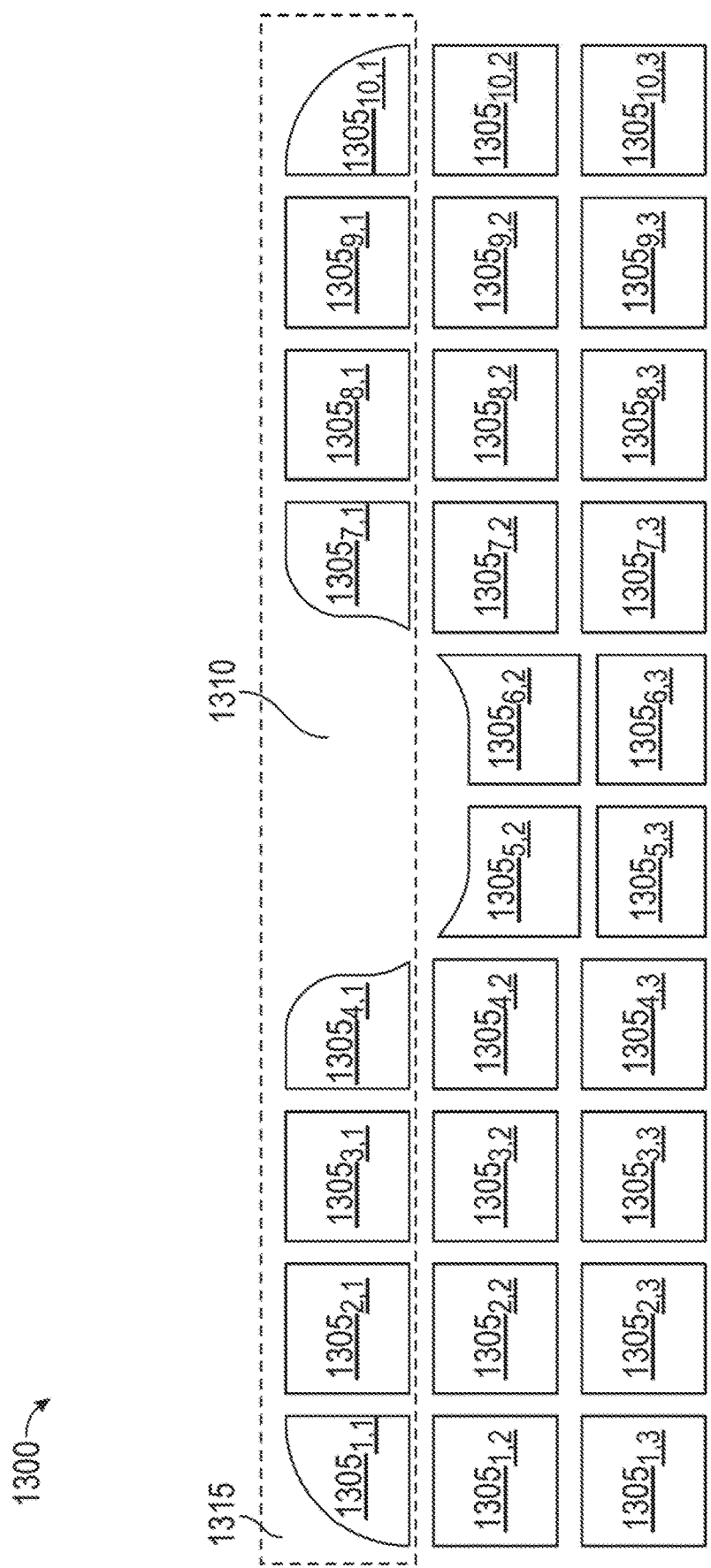

FIG. 13 illustrates sensor electrode pattern 1300 having sensor electrodes 1305 and opening 1310. Sensor electrodes $1305_{1,1}$ and $1305_{10,1}$ have a rounded side that corresponds to a corner region of the sensor electrode pattern 1300 and sensor electrodes $1305_{4,1}$, $1305_{7,1}$, $1305_{5,2}$, and $1305_{6,2}$ have one or more curved or rounded sides that correspond to the shape of opening 1310. Sensor electrodes with a rounded have a decreased area as compared to rectangular sensor electrodes with similar height and widths. In one embodiment, increasing the width and/or height of sensor electrodes, decreases the differences in area of the sensor electrodes across the sensor electrode pattern.

The width for sensor electrodes $1305_{1,1}$ and $1305_{10,1}$ with respect to other sensor electrodes of the sensor electrode pattern 1300 has been increased to increase the top surface area of the corresponding sensing electrodes. Additionally, the width of sensor electrodes $1305_{4,1}$ and $1305_{7,1}$ with respect to other sensor electrodes of the sensor electrode pattern 1300 has been increased to increase the top surface, area of the corresponding sensing electrodes. Further, the width of sensor electrodes $1305_{2,1}$ and $1305_{3,1}$ with respect to other sensor electrodes of the sensor electrode pattern 1300 has been decreased to accommodate the increase in width of sensor electrodes $1305_{1,1}$ and $1305_{4,1}$. The width of sensor electrodes $1305_{6,1}$ and $1305_{9,1}$ with respect to other sensor electrodes of the sensor electrode pattern 1300 has been decreased to accommodate the increased width of sensor electrodes $1305_{7,1}$ and $1305_{10,1}$. In one embodiment, the top surface area of each sensor electrode is about 75% of the top surface area of a nominal sensor electrode. In other embodiments, the top surface area of a sensor electrode is in the range of 50% to 100% of the top surface area of the nominal senor electrode. In such embodiments, the nominal sensor electrode may correspond to a sensor electrode proximate the center of the sensor electrode pattern.

Sensor electrodes $1305_{5,2}$ and $1305_{6,2}$ have an upper edge that corresponds to the shape of the notch area 1310. As illustrated, the height of sensor electrodes $1305_{5,2}$ and $1305_{6,2}$ has been increased with reference to the other sensor electrodes within the sensor electrode pattern 1300 to correspondingly increase the top surface area of the $1305_{5,2}$ and $1305_{6,2}$, such that they have an area substantially similar to the other sensor electrodes of the sensor electrode pattern 1300. Further, the height of sensor electrodes $1305_{5,2}$ and $1305_{5,2}$ is reduced such that they remain aligned with the other sensor electrodes of the same row. The top surface area of sensor electrodes $1305_{5,3}$ and $1305_{6,3}$ is smaller than that of sensor electrodes $1305_{1,3} 1305_{10,3}$. In one embodiment, one or more of sensor electrodes $1305_{5,2}$ and $1305_{6,2}$ may be omitted and sensor electrodes $1305_{5,3}$ and $1305_{6,3}$ may be enlarged. In such an embodiment, the top surface areas of $1305_{5,3}$ and $1305_{6,3}$ are increased such that sensor electrodes $1305_{5,3}$ and $1305_{6,3}$ have a top surface area greater than that of other sensor electrode in the same row. Further, sensor electrodes $1305_{5,3}$ and $1305_{6,3}$ may span multiple rows of sensor electrode. In one embodiment, the top surface area of each sensor electrode is about 75% of the top surface area of a nominal sensor electrode. In other embodiments, the top surface area of a sensor electrode is in the range of 50% to 100% of the top surface area of the nominal senor electrode.

As is illustrated in FIG. 13, sensor electrodes of $1305_{1,1}$-$1305_{10,1}$ are disposed out-of-phase (positionally offset) with sensor electrodes $1305_{1,2}$-$1305_{10,2}$. Further, sensor electrodes $1305_{5,2}$, $1305_{6,2}$, $1305_{5,3}$, and $1305_{6,3}$ are disposed out-of-phase (positionally offset) with sensor electrodes $1305_{4,2}$, $1305_{4,3}$, $1305_{7,2}$, and $1305_{7,3}$. Thus, embodiments herein discuss exemplary arrangements of vias and routing traces and a flexible multiplexing scheme suitable for use with an edge-to-edge display (e.g., an input device having substantially no border regions outside of the display area). Further, the embodiments herein discuss exemplary arrangements for sensor electrodes suitable for use with an edge-to-display (e.g., an input device having substantially no border regions outside of the display area). In one or more embodiments, the arrangements of vias and routing traces and/or flexible multiplexing schemes illustrated in FIGS. 3-6 and described in corresponding description may be combined with the sensor electrode arrangements illustrated in FIGS. 7-13 and described in corresponding description.

In various embodiments, or each glass cutout for an opening (e.g., notch region) formed in the array of sensor electrodes, an order of routing may be reversed to increase distance between the vias and/or routing and the edges of the glass cutout. The multiplexing scheme may be implemented in a separate IC, COG, COF, or on TFT glass. In the case of a TFT glass implementation, the panel may have a predefined routing implementation, so the multiplexing circuitry may be simplified to a hard-wired routing that includes jumpers in a direction across display source lines. Within the multiplexing scheme, (1) the processing system may include multiplexers corresponding to each column of the array, (2) the multiplexers may receive direction control signals with two predefined states, (3) the state of the direction control signals determines a direction of a scan (routing direction), such as top-to-bottom or bottom-to-top, and (4) the multiplexers may be included as a stage of other multiplexing for connecting AFEs to various routing traces according to predefined patterns, e.g., for transcapacitive sensing modes, shorting sensor electrodes together with a single AFE, and so forth.

In various embodiments, the size and shape of one or more sensor electrodes may be varied such that each of the sensor electrodes has a substantially similar top surface area and/or center of mass. For example, sensor electrodes disposed proximate corner regions of the sensor electrode pattern may have a different height and/or width than that of a sensor electrode disposed proximate a center region of the sensor electrode pattern.

In one embodiment, a processing system comprises a sensor module operable with a plurality of sensor electrodes arranged within an array of rows and columns. The sensor module comprises a plurality of analog front-ends, a plurality of multiplexers, and row control circuitry. Each multiplexer of the plurality of multiplexers configured to connect a respective group of sensor electrodes of the plurality of sensor electrodes to a respective analog front-end of the plurality of analog front-ends. The row control the row control circuitry configured to receive a plurality of row control signals corresponding to a plurality of the rows, and output the plurality of row control signals with an ordering selected based, on the direction control signal. In one embodiment, one the multiplexers are controlled based at least partly on the plurality of row control signals. In one embodiment, each of the multiplexers is coupled to two or more columns of the plurality of columns.

In one embodiment, each of the plurality of sensor electrodes disposed in a first column of a plurality of columns adjacent to a first side, edge of an input object is coupled to a respective routing trace through a respective one of a first plurality of vias arranged in a first direction, each of the plurality of sensor electrodes disposed in a second column of the columns adjacent to a second side edge of the input device is coupled to a respective routing trace through a respective one of a second plurality of vias arranged in a second direction different than the first direction, and the ordering selected based on the direction control signal corresponds to one of the first direction and the second direction.

In one embodiment, the sensor module is configured to, according to, a first scan pattern, drive sensing signals onto a first plurality of output pads corresponding the first direction, and according to a second scan pattern, drive sensing signals onto a second plurality of output pads corresponding the second direction. In one embodiment, the row control circuitry is configured to, using the direction control signal, for one or more first columns, couple the sensing signals onto corresponding sensor electrodes according to the first direction, and for one or more second columns, couple the sensing signals onto corresponding sensor electrodes in the second direction.

In one embodiment, a sensing device comprises a plurality of sensor electrodes arranged in an array of rows and columns. The array defines an area having a top edge and a first side edge connected with the top edge through a first corner region. The plurality of sensor electrodes comprises a first sensor electrode disposed proximate the first corner region, and a second sensor electrode disposed proximate a center region of the array. The first sensor electrode differs from the second sensor electrode in at least one of size and shape.

In one embodiment, the top edge comprises an opening, e.g., a notched region, and the plurality of sensor electrodes further comprises a third sensor electrode disposed proximate the opening and has at least one of a different size and shape than that of the second sensor electrode.

In one embodiment, the area comprises a second side edge, connected with the top edge through a second corner region, the plurality of sensor electrodes comprises a third sensor electrode disposed proximate the second corner region, and the third sensor electrode is different from the second sensor electrode in at least one of a size and shape.

In one embodiment, the first sensor electrode differs from the second sensor electrode in both size and shape. In an embodiment, the first sensor electrode comprises a rounded side, a top surface area that is smaller than a top surface area of the second sensor electrode, and a center-of-mass relative to the top surface area of the first sensor electrode that is different than a center-of-mass of the second sensor electrode relative to the top surface area of the second sensor electrode.

In one embodiment, the plurality of sensor electrodes comprises a third sensor electrode disposed between the first sensor electrode and the second sensor electrode, and the third sensor electrode has a top surface area less than the top surface area of the second sensor electrode and greater than the top surface area of the first sensor electrode.

In one embodiment, the plurality of sensor electrodes comprises a fourth sensor electrode disposed proximate the first sensor electrode and the first side edge, the fourth sensor electrode comprises a top surface area greater than the top surface area of the second sensor electrode.

In one embodiment, a first subset of sensor electrodes is disposed between the second sensor electrode and the first side edge, and the width of each of the first subset of sensor electrodes increases based on a distance between each sensor electrode of the subset of sensor electrodes and the second sensor electrode, and a second subset of sensor electrodes disposed between the second sensor electrode and the top edge, and a height of each of the second subset of sensor electrodes increases based on a distance between each of the subset of sensor electrodes and the second sensor electrode increases.

In one embodiment, the plurality of sensor electrodes comprises a third sensor electrode disposed proximate the first corner region, and the first sensor electrode and the third sensor electrode include a rounded side and an angled side having an angle of less than 90 degrees with the top edge. In one embodiment, the angled side of the first and third sensor electrodes comprises a shape corresponding to one or more pixels of a display device.

In one embodiment, the plurality of sensor electrodes further comprises a first row of sensor electrodes, and a second row of sensor electrodes disposed between the top edge and the first row of sensor electrodes, wherein each electrode of the second row of sensor electrodes is out of phase with the first row of sensor electrodes, and the center-of-mass of each of the second row of sensor electrodes differs from a center-of-mass of each of the first row of sensor electrodes relative to their shape.

In one embodiment, the sensing device further comprises a plurality of routing traces, each of the plurality of routing traces coupled to a respective one of the plurality of sensor electrodes. A first column of the plurality of sensor electrodes is disposed between a second column of the plurality of sensor electrodes and the first side edge, the first column comprises a third sensor electrode disposed proximate a bottom edge of the substantially contiguous area, and the second column comprises a fourth sensor electrode disposed proximate the top edge. The first sensor electrode is coupled to a first routing trace of the plurality traces, the third sensor electrode is coupled to a second routing trace of the plurality of routing traces, the fourth sensor electrode coupled to a third routing trace of the plurality of routing traces, and the first routing trace is disposed between the second routing trace and the third routing trace.

In one embodiment, a processing system for an input device is configured to drive a plurality of sensor electrodes for capacitive sensing to acquire a plurality of capacitive measurements, and determine a position of an input object based on the plurality of capacitive measurements. The plurality of sensor electrodes is arranged within an array of rows and columns. The array defining a substantially contiguous area having a top edge, a first side edge connected with the top edge through a first corner region, and a second side edge connected with the top edge through a second corner region. The plurality of sensor electrodes comprise a first sensor electrode disposed proximate the first corner region, and a second sensor electrode disposed proximate a center region of the array, where the first sensor electrode differs from the second sensor electrode in at least one of a size and shape.

In one embodiment, the top edge comprises an opening, and the plurality of sensor electrodes further comprises a third sensor electrode disposed proximate the opening and has at least one of a different size and shape than that of the second sensor electrode.

In one embodiment, the plurality of sensor electrodes further comprises a third sensor electrode disposed proximate the second corner region, the third sensor electrode differs from the second sensor electrode in at least one of a size and shape.

In one embodiment, a method for driving an input device comprises driving a plurality of sensor electrodes for capacitive sensing to acquire a plurality of capacitive measurements, and determining a position of an input object based on the plurality of capacitive measurements. The plurality of sensor electrodes is arranged within an array of rows and columns. The array defining a substantially contiguous area having a top edge, a first side edge connected with the top edge through a first corner region, and a second side edge connected with the top edge through a second corner region. The plurality of sensor electrodes comprise a first sensor electrode disposed proximate the first corner region, and a second sensor electrode disposed proximate a center region of the array, where the first sensor electrode differs from the second sensor electrode in at least one of a size and shape.

In one embodiment the top edge comprises an opening, and the plurality of sensor electrodes further comprises a third sensor electrode disposed proximate the opening, and has at least one of a different size and shape than that of the second sensor electrode.

In one embodiment, the plurality of sensor electrodes further comprises third sensor electrode disposed proximate the second corner region, the third sensor electrode differs from the second sensor electrode in at least one of a size and shape.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A sensing device comprising:
   a plurality of sensor electrodes arranged as an array of rows and columns including a first column of sensor electrodes and a second column of sensor electrodes;
   a first plurality of vias corresponding to the first column, wherein the first plurality of vias are arranged in a left-to-right direction such that: a topmost via of the first plurality of vias is leftmost out of the first plurality of vias and each respective via of the first plurality of vias below the topmost via of the first plurality of vias is to the right of the via directly above the respective via;
   a second plurality of vias corresponding to the second column, wherein the second plurality of vias are arranged in a right-to-left direction such that: a topmost via of the second plurality of vias is rightmost out of the second plurality of vias and each respective via of the second plurality of vias below the topmost via of the second plurality of vias is to the left of the via directly above the respective via;
   a plurality of routing traces, wherein each of the plurality of sensor electrodes of the first column is configured to be coupled to a respective one of the plurality of routing traces through a respective one of the first plurality of vias, and wherein each of the plurality of sensor electrodes of the second column is configured to be coupled to a respective one of the plurality of routing traces through a respective one of the second plurality of vias; and
   a processing system configured to operate both the first and second columns of sensor electrodes in a consistent top-to-bottom or bottom-to-top scan direction according to a plurality of row control signals and a direction control signal by asserting the row control signals with a first value of the direction control signal for the first column and asserting the row control signals with a second value of the direction control signal for the second column.

2. The sensing device of claim 1, wherein a first sensor electrode of a topmost row of the plurality of sensor electrodes has a shape corresponding to a first curved corner feature and a second sensor electrode of the topmost row of the plurality of sensor electrodes has a shape corresponding to a second curved corner feature.

3. The sensing device of claim 2, wherein the shape and a top surface area of the first sensor electrode of the topmost row of the plurality of sensor electrodes and the shape and a top surface area of the second sensor electrode of the topmost row of the plurality of sensor electrodes differs from a shape and top surface area of a first sensor electrode of a second row of the plurality of sensor electrodes.

4. The sensing device of claim 3, wherein the top surface area of the first sensor electrode of the topmost row of the plurality of sensor electrodes and the top surface area of the second sensor electrode of the plurality of row of the plurality of sensor electrodes is less than the top surface area of the first sensor electrode of the second row of the plurality of sensor electrodes.

5. The sensing device of claim 1, wherein a top edge of the array has a shape defined by an opening proximate to the top edge.

6. The sensing device of claim 1, wherein the array is symmetrical about a center line of the plurality of sensor electrodes.

7. The sensing device of claim 3, wherein
a center-of-mass relative to the top surface area of the first sensor electrode of the topmost row of the plurality of sensor electrode is different than a center-of-mass relative to the top surface area of the first sensor electrode of the second row of the plurality of sensor electrodes.

8. A method for operating a sensing device, the method comprising:
driving of a plurality of sensor electrodes to acquire resulting signals from the plurality of sensor electrodes, wherein the plurality of sensor electrodes are arranged as an array of rows and columns including a first column of sensor electrodes and a second column of sensor electrodes; and
determining positional information for an input object based at least in part on the resulting signals;
wherein driving the plurality of sensor electrodes to acquire resulting signals from the plurality of sensor electrodes comprises operating both the first and second columns of sensor electrodes in a consistent top-to-bottom or bottom-to-top scan direction according to a plurality of row control signals and a direction control signal by asserting the row control signals with a first value of the direction control signal for the first column and asserting the row control signals with a second value of the direction control signal for the second column.

9. The method of claim 8, wherein driving the plurality of sensor electrodes to acquire resulting signals from the plurality of sensor electrodes further comprises:
applying a first row control signal and a second row control signal to a first multiplexer to selectively couple a first sensor electrode of a first row of the plurality of sensor electrodes and a second sensor electrode of a second row of the plurality of sensor electrodes with a first analog front end via the first multiplexer.

10. The sensing device of claim 1, wherein each of the row control signals is input into two switches, and wherein the direction control signal controls which of the two switches is active according to a value of the direction control signal.

11. The sensing device of claim 10, wherein the two switches corresponding to a respective row control signal comprise one NMOS switch and one PMOS switch.

12. The sensing device of claim 10, wherein the processing system is further configured to utilize outputs from the switches together with column control signals to control whether resulting signals are obtained from the first column and/or the second column and an order in which the resulting signals are obtained.

13. The sensing device of claim 1, wherein the processing system further comprises a plurality of analog front ends (AFEs), including a first plurality of AFEs corresponding to the first column and a second plurality of AFEs corresponding to the second column.

14. The sensing device of claim 13, wherein the first plurality of AFEs include: a first AFE corresponding to a first plurality of rows of the first column, and a second AFE corresponding to a second plurality of rows of the first column; and
wherein the second plurality of AFEs include: a third AFE corresponding to a first plurality of rows of the second column, and a fourth AFE corresponding to a second plurality of rows of the second column.

15. The sensing device of claim 1, wherein the first column and the second column are adjacent to one another.

16. A processing system for a sensing device, comprising:
row control circuitry;
one or more analog front ends (AFEs); and
one or more multiplexers configured to receive resulting signals from an array of sensor electrodes arranged as an array of rows and columns, wherein the array includes a first column of sensor electrodes and a second column of sensor electrodes;
wherein the row control circuitry is configured to selectively provide, according to a direction control signal, row control signals for controlling the one or more multiplexers;
wherein the one or more multiplexers are configured to provide respective resulting signals from respective sensor electrodes of the array of sensor electrodes to the one or more AFEs based on the row control signals; and
wherein a first value of the direction control signal corresponds to a top-to-bottom scan direction for a respective column of the array of sensor electrodes, and a second value of the direction control signal corresponds to a bottom-to-top scan direction for the respective column of the array of sensor electrodes.

17. The processing system of claim 16, wherein each of the row control signals is input into two switches of the row control circuitry, and wherein the direction control signal controls which of the two switches is active according to a value of the direction control signal.

18. The processing system of claim 17, wherein the two switches corresponding to a respective row control signal comprise one NMOS switch and one PMOS switch.

19. The processing system of claim 16, wherein the processing system further comprises logic circuitry which is configured to:
receive outputs from the switches and receive column control signals; and
output, based on the outputs from the switches and the column control signals, signals which control whether resulting signals are obtained from the first column and/or the second column and an order in which the resulting signals are obtained.

20. The processing system of claim 16, wherein the one or more AFEs comprise a first plurality of AFEs corresponding to the first column and a second plurality of AFEs corresponding to the second column.

21. The processing system of claim 20, wherein the first plurality of AFEs include: a first AFE corresponding to a first plurality of rows of the first column, and a second AFE corresponding to a second plurality of rows of the first column; and
wherein the second plurality of AFEs include: a third AFE corresponding to a first plurality of rows of the second column, and a fourth AFE corresponding to a second plurality of rows of the second column.

\* \* \* \* \*